（12）United States Patent
Takamatsu et al.

(10) Patent No.: US 8,575,875 B2
(45) Date of Patent: Nov. 5, 2013

(54) CONTROL DEVICE FOR VOLTAGE CONVERTER, VEHICLE EQUIPPED WITH THE SAME, AND CONTROL METHOD FOR VOLTAGE CONVERTER

(75) Inventors: Naoyoshi Takamatsu, Susono (JP); Masaki Okamura, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 203 days.

(21) Appl. No.: 13/319,138

(22) PCT Filed: May 27, 2009

(86) PCT No.: PCT/JP2009/059665
§ 371 (c)(1),
(2), (4) Date: Nov. 7, 2011

(87) PCT Pub. No.: WO2010/137127
PCT Pub. Date: Dec. 2, 2010

(65) Prior Publication Data
US 2012/0049774 A1    Mar. 1, 2012

(51) Int. Cl.
*H02P 6/14* (2006.01)
(52) U.S. Cl.
USPC .......... 318/400.26; 318/801; 318/9; 318/255; 318/34; 318/77; 315/291; 315/111.21; 315/306; 315/308; 307/45; 324/430; 324/433; 323/222; 323/272; 323/282; 323/271; 180/65.265; 180/65.275
(58) Field of Classification Search
USPC ................ 318/9, 801, 105, 109, 112, 34, 77, 318/400.18, 255, 400.21, 254.1; 363/98, 363/132, 89, 17, 56.03; 323/222, 272, 282, 323/271; 324/430, 433, 247; 701/54, 55; 427/530; 307/45, 46, 72; 315/291, 315/111.21, 111.81, 306, 308; 180/291, 180/111.21, 111.81, 306, 308
See application file for complete search history.

(56) References Cited

U.S. PATENT DOCUMENTS

| 5,373,195 | A | * | 12/1994 | De Doncker et al. ........... 307/45 |
| 7,164,253 | B2 | * | 1/2007 | Sato et al. .................... 318/801 |
| 7,701,156 | B2 | * | 4/2010 | Okamura ...................... 318/255 |
| 2006/0055349 | A1 | * | 3/2006 | Nakayama et al. ........... 318/254 |
| 2006/0114702 | A1 | * | 6/2006 | Yamada et al. ............... 363/132 |
| 2007/0216323 | A1 | * | 9/2007 | Ishikawa et al. .................. 318/9 |

FOREIGN PATENT DOCUMENTS

| JP | 5-137320 A | 6/1993 |
| JP | 2006-254593 A | 9/2006 |
| JP | 2007-068253 A | 3/2007 |
| JP | 2007-325435 A | 12/2007 |
| WO | 03/015254 A1 | 2/2003 |
| WO | 2006/104268 A1 | 10/2006 |

* cited by examiner

*Primary Examiner* — Eduardo Colon Santana
*Assistant Examiner* — Jorge Carrasquillo
(74) *Attorney, Agent, or Firm* — Sughrue Mion, PLLC

(57) ABSTRACT

In a converter of a motor drive control device, one of a first switching element and a second switching element is selected in accordance with a current command value of a current flowing through a reactor. The converter is then controlled so that a drive command for the selected switching element is generated. In this way, the efficiency of the converter is improved while a voltage step-up or step-down operation is performed by the converter.

13 Claims, 29 Drawing Sheets

$VB - L \cdot dIL/dt = 0$ $VB - L \cdot dIL/dt - VM = 0$

CONTROL DEVICE FOR VOLTAGE CONVERTER, VEHICLE EQUIPPED WITH THE SAME, AND CONTROL METHOD FOR VOLTAGE CONVERTER

CROSS REFERENCE TO RELATED APPLICATIONS

This application is a National Stage of International Application No. PCT/JP2009/059665 filed May 27, 2009, the contents of all of which are incorporated herein by reference in their entirety.

TECHNICAL FIELD

The present invention relates to a control device for a voltage converter and a vehicle equipped with the same, as well as a control method for a voltage converter, and more specifically to control for improving efficiency by reducing a loss of the voltage converter.

BACKGROUND ART

Recently, electrically-powered vehicles have been of interest as environmentally-friendly vehicles. The electrically-powered vehicles are each equipped with a power storage device (such as secondary battery or capacitor for example) and travel using a drive force generated from electric power stored in the power storage device. The electrically-powered vehicles include for example electric vehicles, hybrid vehicles, fuel cell vehicles, and the like.

Some of these electrically powered vehicles have a motor generator receiving electric power from the power storage device to generate a drive force for the vehicle to travel when started or accelerated, and generating electric power by means of regenerative braking when the vehicle is braked to store the generated electrical energy in the power storage device. Thus, in order to control the motor generator as appropriate for the traveling condition, the electrically powered vehicles are each equipped with an inverter.

Some of such vehicles have a voltage converter (converter) between the power storage device and the inverter for stably supplying electric power which is required by the inverter and varies depending on the vehicle condition. This converter can be used to provide an input voltage of the inverter higher than an output voltage of the power storage device so that a high motor output is achieved, and reduce the motor current for the same output so that smaller sizes of the inverter and the motor as well as a lower cost are achieved.

In order to further improve the fuel economy of the electrically powered vehicles, it is important to reduce a loss of this converter and thereby improve the efficiency.

WO2003/015254 (PTL 1) discloses a motor drive control device converting an output voltage from a DC power supply by means of a converter to supply the converted voltage to an inverter which drives a motor. When a target input voltage value of the inverter is lower than a power supply voltage of the DC power supply, the motor drive control device renders an upper switching element of the converter ON and renders a lower switching element thereof OFF.

When the motor operates at a low rotational speed where a target input voltage value of the inverter is lower than a power supply voltage of the DC power supply, this motor drive control device can reduce a switching loss by stopping the operation of the switching element and thereby improve the efficiency of the converter.

CITATION LIST

Patent Literature

PTL 1: WO2003/015254
PTL 2: Japanese Patent Laying-Open No. 05-137320
PTL 3: Japanese Patent Laying-Open No. 2007-325435
PTL 4: WO2006/104268

SUMMARY OF INVENTION

Technical Problem

WO2003/015254 (PTL 1) is applied to the case where a target input voltage value of the inverter is lower than a power supply voltage of the DC power supply such as the case where the motor's rotational speed is low, namely the case where the voltage step-up and step-down operations of the converter are not required and the motor can be driven with an output voltage of the power storage device.

A problem here is therefore that the technique disclosed in WO2003/015254 (PTL 1) cannot improve the efficiency of the converter when the voltage step-up or step-down operation of the converter is necessary.

The present invention has been made to solve such a problem, and an object of the present invention is to improve the efficiency of a voltage converter of a motor drive control system while a voltage step-up or voltage step-down operation is performed.

Solution to Problem

A control device for a voltage converter of the present invention is a control device for a voltage converter capable of a voltage conversion between a power storage device and a load device, and the voltage converter includes: a first switching element and a second switching element connected in series between an electric power line for the load device and a ground line; a first rectifying element and a second rectifying element connected in parallel with the first switching element and the second switching element respectively, with a forward direction being defined as a direction from the ground line toward the electric power line; and a reactor provided on a path connecting a connection node of the first switching element and the second switching element and a positive terminal of the power storage device. The control device includes: a current command calculation unit configured to calculate a current command value of a current flowing through the reactor by performing feedback control of a voltage between the electric power line and the ground line; a selection unit configured to select one of the first switching element and the second switching element in accordance with the current command value; and a drive command generation unit configured to generate a drive command for the switching element selected by the selection unit.

Preferably, the selection unit selects the second switching element when the current command value represents a direction from the power storage device toward the load device, and selects the first switching element when the current command value represents a direction from the load device toward the power storage device.

Still preferably, the voltage converter has a first mode and a second mode as operation modes. In the first mode, a voltage conversion is performed by driving the switching element selected by the selection unit. In the second mode, a voltage conversion is performed by driving both the first switching element and the second switching element. The voltage converter further includes a voltage detector for detecting a voltage between the electric power line and the ground line. The control device further includes a reference value calculation unit configured to calculate a current range in which the first mode is executed, based on the voltage detected by the voltage detector. The selection unit causes the first mode to be executed when the current command value falls in the current range, and causes the second mode to be executed when the current command value falls out of the current range.

Preferably, the voltage converter further includes a current detector configured to detect a reactor current flowing through the reactor. The control device further includes: a current control unit configured to perform feedback control based on a comparison between the current command value and the reactor current; and a gain calculation unit configured to be capable of making a feedback gain variable of the current control unit in accordance with the current command value. When the first mode is executed, the gain calculation unit makes the feedback gain larger relative to when the second mode is executed.

Still preferably, the control device further includes an intermittent drive control unit configured to reduce a drive number representing the number of times the first switching element and the second switching element are driven per unit time, in accordance with the current command value, when the first mode is executed.

More preferably, when the first mode is executed, the intermittent drive control unit sets an ON period of the first switching element and the second switching element longer relative to when the drive number is not reduced, and sets the drive number per unit time so that an average value of the reactor current along a time axis is equal to the current command value.

Preferably, when the first mode is executed, the intermittent drive control unit performs control so that a carrier frequency for controlling switching of the first switching element and the second switching element is reduced.

Preferably, the control device further includes a load calculation unit configured to detect a load variation of the load device. When the load variation falls out of a reference range, the selection unit causes the second mode to be executed regardless of the current command value.

A vehicle of the present invention includes a power storage device, a rotating electric machine, an inverter, a voltage converter, and a control device. The rotating electric machine generates a drive force to propel the vehicle. The inverter drives the rotating electric machine. The voltage converter is configured to be capable of a voltage conversion between the power storage device and the inverter. The control device controls the voltage converter. The voltage converter includes: a first switching element and a second switching element connected in series between an electric power line for the inverter and a ground line; a first rectifying element and a second rectifying element connected in parallel with the first switching element and the second switching element, respectively, with a forward direction being defined as a direction from the ground line toward the electric power line; and a reactor provided on a path connecting a connection node of the first switching element and the second switching element and a positive terminal of the power storage device. The control device includes: a current command calculation unit configured to calculate a current command value of a current flowing through the reactor by performing feedback control of a voltage between the electric power line and the ground line; a selection unit configured to select one of the first switching element and the second switching element in accordance with the current command value; and a drive command generation unit configured to generate a drive command for the switching element selected by the selection unit.

Preferably, the selection unit selects the second switching element when the current command value represents a direction from the power storage device toward the inverter, and selects the first switching element when the current command value represents a direction from the inverter toward the power storage device.

Still preferably, the voltage converter has a first mode and a second mode as operation modes. In the first mode, a voltage conversion is performed by driving the switching element selected by the selection unit. In the second mode, a voltage conversion is performed by driving both the first switching element and the second switching element. The voltage converter further includes a voltage detector for detecting a voltage between the electric power line and the ground line. The control device further includes a reference value calculation unit configured to calculate a current range in which the first mode is executed, based on the voltage detected by the voltage detector. The selection unit causes the first mode to be executed when the current command value falls in the current range, and causes the second mode to be executed when the current command value falls out of the current range.

Preferably, the voltage converter further includes a current detector configured to detect a reactor current flowing through the reactor. The control device further includes: a current control unit configured to perform feedback control based on a comparison between the current command value and the reactor current; and a gain calculation unit configured to be capable of making a feedback gain variable of the current control unit in accordance with the current command value. When the first mode is executed, the gain calculation unit makes the feedback gain larger relative to when the second mode is executed.

Preferably, the control device further includes an intermittent drive control unit configured to reduce a drive number representing the number of times the first switching element and the second switching element are driven per unit time, in accordance with the current command value, when the first mode is executed.

Still preferably, the control device further includes a load calculation unit configured to detect a load variation of the inverter. When the load variation falls out of a reference range, the selection unit causes the second mode to be executed regardless of the current command value.

A control method for a voltage converter of the present invention is a control method for a voltage converter capable of a voltage conversion between a power storage device and a load device. The voltage converter includes: a first switching element and a second switching element connected in series between an electric power line for the load device and a ground line; a first rectifying element and a second rectifying element connected in parallel with the first switching element and the second switching element, respectively, with a forward direction being defined as a direction from the ground line toward the electric power line; and a reactor provided on a path connecting a connection node of the first switching element and the second switching element and a positive terminal of the power storage device. The control method includes the steps of: calculating a current command value of a current flowing through the reactor by performing feedback control of a voltage between the electric power line and the ground line; selecting one of the first switching element and the second switching element in accordance with the current command value; and generating a drive command for the switching element selected by the selection unit.

Advantageous Effects of Invention

The present invention can improve the efficiency of the voltage converter of the motor drive control system while a voltage step-up or step-down operation is performed.

DESCRIPTION OF EMBODIMENTS

Figure 1:
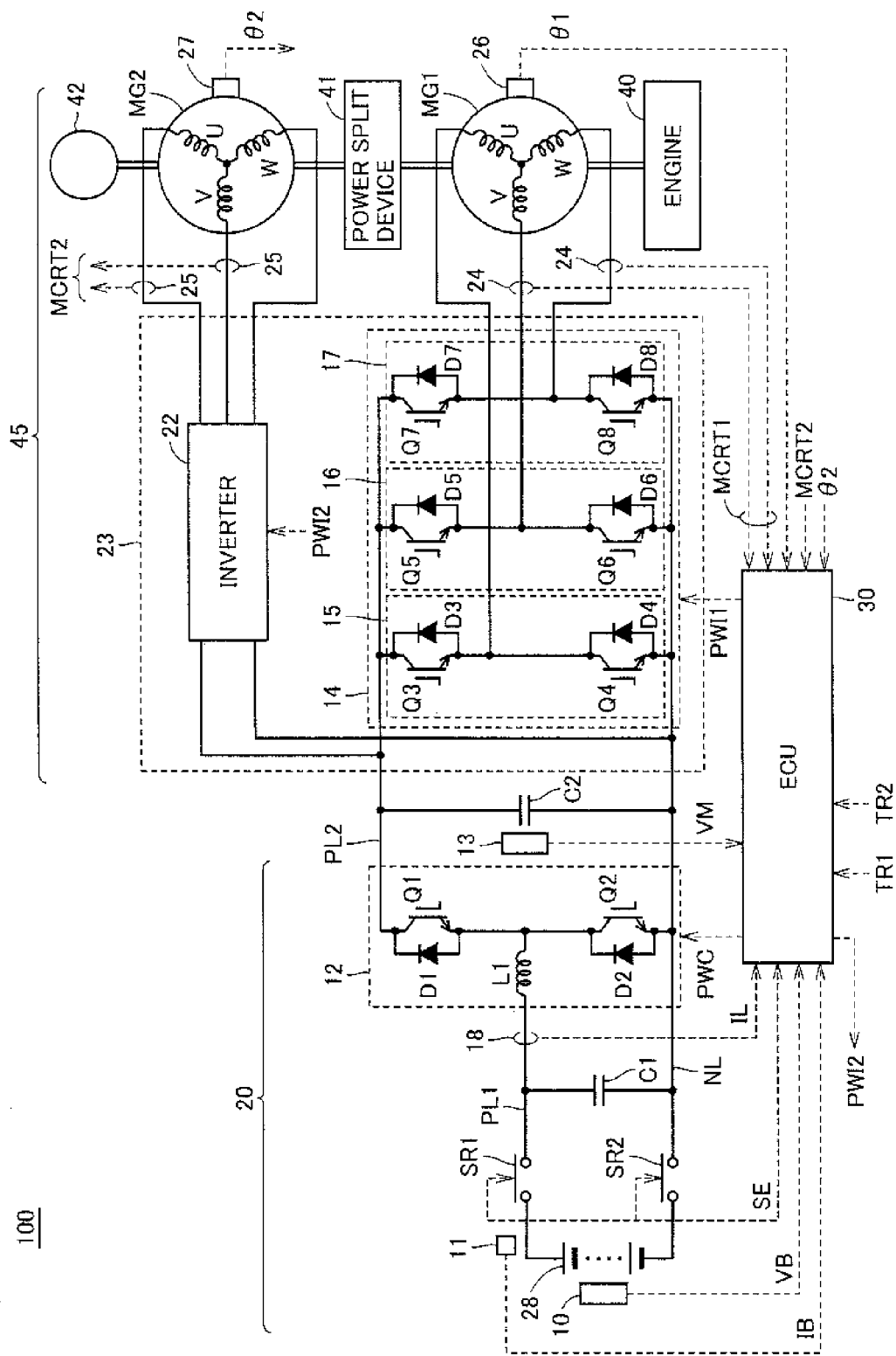
FIG. 1 is an entire configuration diagram of a motor drive control system to which a control device for an AC motor in a first embodiment is applied.

In the following, the embodiments of the present invention will be described in detail with reference to the drawings. In the drawings, the identical or corresponding components are denoted by the identical reference characters, and a description thereof will not be repeated.

First Embodiment

FIG. 1 is an entire configuration diagram of a hybrid vehicle 100 mounted with a motor drive control system to which applied a control device for an AC electric motor according to a first embodiment. In connection with the first embodiment, the hybrid vehicle mounted with an engine and motor generators will be described as vehicle 100 by way of example. The configuration of vehicle 100, however, is not limited to this, and the control device is applicable to any vehicle as long as the vehicle is capable of traveling using electric power from a power storage device. Vehicle 100 includes vehicles such as electric vehicle and fuel cell vehicle besides the hybrid vehicle.

Further, in connection with the present embodiment, the configuration of the motor drive control system for a vehicle will be described. This motor drive control system, however, is also applicable to any device other than the vehicle as long as the device is driven by an AC electric motor.

Referring to FIG. 1, vehicle 100 includes a DC voltage generation unit 20, a load device 45, a smoothing capacitor C2, and a control device (hereinafter also referred to as ECU (Electronic Control Unit)) 30.

DC voltage generation unit 20 includes a power storage device 28, system relays SR1, SR2, a smoothing capacitor C1, and a converter 12.

Power storage device 28 is typically configured to include a secondary battery such as nickel-metal hydride or lithium ion secondary battery, or a power storage device such as electric double layer capacitor. A DC voltage VB which is output from power storage device 28 and a DC current IB which is input and output to and from power storage device 28 are detected by a voltage sensor 10 and a current sensor 11, respectively. Voltage sensor 10 and current sensor 11 output respective detected DC voltage VB and DC current TB to ECU 30.

System relay SR1 is connected between a positive terminal of power storage device 28 and an electric power line PL1, and system relay SR2 is connected between a negative terminal of power storage device 28 and a ground line NL. System relays SR1, SR2 are controlled by a signal SE from ECU 30, and make a switch between supply and cut-off of electric power from power storage device 28 to converter 12.

Converter 12 includes a reactor L1, switching elements Q1, Q2, and diodes D1, D2. Switching elements Q1 and Q2 are connected in series between an electric power line PL2 and ground line NL. Switching elements Q1 and Q2 are controlled by a switching control signal PWC from ECU 30.

In the present embodiment, IGBT (Insulated Gate Bipolar Transistor), power MOS (Metal Oxide Semiconductor) transistor, or power bipolar transistor or the like may be used as the switching element. For switching elements Q1, Q2, antiparallel diodes D1, D2 are arranged. Reactor L1 is provided between a connection node which connects switching elements Q1 and Q2, and electric power line PL1. Smoothing capacitor C2 is connected between electric power line PL2 and ground line NL.

A current sensor 18 detects a reactor current which flows through reactor L1, and outputs its detected value IL to ECU 30.

Load device 45 includes an inverter 23, motor generators MG1, MG2, an engine 40, a power split device 41, and drive wheels 42. Inverter 23 includes an inverter 14 for driving motor generator MG1 and an inverter 22 for driving motor generator MG2. It is not requisite for this configuration to include two sets of inverters and motor generators as shown in FIG. 1, and the configuration may include for example only one of a set of inverter 14 and motor generator MG1 and a set of inverter 22 and motor generator MG2.

Motor generators MG1, MG2 receive AC power supplied from inverter 23 to generate a rotational drive force for propelling the vehicle. Motor generators MG1, MG2 also receive an externally supplied rotational force to generate AC power in response to a regenerative torque command from ECU 30, and generate a regenerative brake force to be exerted on vehicle 100.

Further, motor generators MG1, MG2 are connected to engine 40 via power split device 41. The motor generators MG1, MG2 and engine 40 are controlled so that an optimum ratio is achieved between the drive force generated by engine 40 and the drive force generated by motor generators MG1, MG2. Here, one of motor generators MG1, MG2 may be operated to function solely as an electric motor, and the other generator may be operated to function solely as an electric generator. In the first embodiment, motor generator MG1 is operated to function as an electric generator driven by engine 40, and motor generator MG2 is operated to function as an electric motor which drives drive wheels 42.

As power split device 41, a planetary gear train (planetary gear) is used for distributing the motive power of engine 40 to both of drive wheels 42 and motor generator MG1.

Inverter 14 receives a stepped-up voltage from converter 12 and drives motor generator MG1 in order to, for example, start engine 40. Inverter 14 also outputs, to converter 12, regenerative electric power which is generated by motor generator MG1 from mechanical power transmitted from engine 40. At this time, converter 12 is controlled by ECU 30 so that the converter operates as a voltage step-down circuit.

Inverter 14 is configured to include a U phase upper-lower arm 15, a V phase upper-lower arm 16, and a W phase upper-lower arm 17 that are provided in parallel between electric power line PL2 and ground line NL. The upper-lower arm of each phase is configured to include switching elements connected in series between electric power line PL2 and ground line NL. Specifically, U phase upper-lower arm 15 is configured to include switching elements Q3, Q4, V phase upper-lower arm 16 is configured to include switching elements Q5, Q6, and W phase upper-lower arm 17 is configured to include switching elements Q7, Q8. To switching elements Q3 to Q8, antiparallel diodes D3 to D8 are connected, respectively. Switching elements Q3 to Q8 are controlled by a switching control signal PWI from ECU 30.

Typically, motor generator MG1 is a three-phase permanent-magnet synchronous motor. Each of the three coils of U, V, and W phases has one end connected commonly to a neutral point. Further, each phase coil has the other end connected to a connection node between the switching elements of a corresponding one of upper-lower arms 15 to 17.

Inverter 22 is connected to converter 12 in parallel with inverter 14.

Inverter 22 converts a DC voltage which is output from converter 12 into a three-phase AC, and outputs the resultant AC to motor generator MG2 which drives drive wheels 42. Inverter 22 also outputs to converter 12 regenerative electric power which is generated by motor generator MG2 by means of regenerative braking. At this time, converter 12 is controlled by ECU 30 so that the converter operates as a voltage step-down circuit. The internal configuration (not shown) of inverter 22 is similar to that of inverter 14, and the detailed description thereof will not be repeated.

Converter 12 is basically controlled so that switching elements Q1 and Q2 are complementarily and alternately ON and OFF in each switching period. When converter 12 performs a voltage step-up operation, it steps up DC voltage VB supplied from power storage device 28 to a DC voltage VM (this DC voltage corresponding to an input voltage to inverter 14 will also be referred to as "system voltage" hereinafter). This voltage step-up operation is carried out by supplying an electromagnetic energy accumulated at reactor L1 in an ON period of switching element Q2 to electric power line PL2 via switching element Q1 and antiparallel diode D1.

In contrast, when converter 12 performs a voltage step-down operation, it steps down DC voltage VM to DC voltage VB. This voltage step-down operation is carried out by supplying an electromagnetic energy accumulated at reactor L1 in an ON period of switching element Q1 to ground line NL via switching element Q2 and antiparallel diode D2.

The voltage conversion ratio (ratio between VM and VB) of these voltage step-up operation and voltage step-down operation is controlled by the ON period ratio (duty cycle) of switching elements Q1, Q2 to the above-described switching period. Switching elements Q1 and Q2 may also be fixed in ON and OFF states respectively to satisfy VM=VB (voltage conversion ratio=1.0).

Smoothing capacitor C2 smoothes the DC voltage from converter 12 and supplies the smoothed DC voltage to inverter 23. A voltage sensor 13 detects the voltage across smoothing capacitor C2, namely system voltage VM, and outputs the detected value to ECU 30.

In the case where a torque command value of motor generator MG1 is positive (TR1>0), inverter 14 converts a DC voltage supplied from smoothing capacitor C2 into an AC voltage by means of switching operations of switching elements Q3 to Q8 in response to a switching control signal PWI1 from ECU 30 to drive motor generator MG1 so that the motor generator outputs a positive torque. In the case where a torque command value of motor generator MG1 is zero (TR1=0), inverter 14 converts the DC voltage into an AC voltage by means of the switching operations in response to switching control signal PWI1 to drive motor generator MG1 so that the torque is zero. In this way, motor generator MG1 is driven to generate zero or positive torque specified by torque command value TR1.

Further, when vehicle 100 is regeneratively braked, torque command value TR1 of motor generator MG1 is set to a negative value (TR1<0). In this case, inverter 14 converts an AC voltage generated by motor generator MG1 into a DC voltage by the switching operations in response to switching control signal PWI1, and supplies the DC voltage (system voltage) generated by the conversion to converter 12 via smoothing capacitor C2. Regenerative braking herein includes braking which is effected in response to manipulation of a foot brake by a driver who drives the electrically powered vehicle and by which electric power is regeneratively generated, as well as deceleration (or stoppage of acceleration) of the vehicle which is effected by release of the accelerator pedal without manipulation of the foot brake while the vehicle is traveling and by which electric power is regeneratively generated.

Similarly, inverter 22 receives a switching control signal PWI2 from ECU 30 in accordance with a torque command value of motor generator MG2, and performs a switching operation in response to switching control signal PWI2 to convert a DC voltage into an AC voltage and drive motor generator MG2 so that a predetermined torque is generated.

Current sensors 24, 25 detect motor currents MCRT1, MCRT2 flowing through motor generators MG1, MG2, and output respective detected motor currents to ECU 30. Since the sum of respective instantaneous values of the U phase current, the V phase current, and the W phase current is zero, it is sufficient that current sensors 24, 25 are arranged to detect motor currents of two phases as shown in FIG. 1.

Rotational angle sensors (resolvers) 26, 27 detect rotational angles $\theta 1$, $\theta 2$ of motor generators MG1, MG2, and transmit respective detected rotational angles $\theta 1$, $\theta 2$ to ECU 30. Based on rotational angles $\theta 1$, $\theta 2$, ECU 30 can calculate rotational speeds MRN1, MRN2 and angular velocities $\omega 1$, $\omega 2$ (rad/s) of motor generators MG1, MG2. Rotational angle sensors 26, 27 may not be arranged and instead ECU 30 may directly calculate rotational angles $\theta 1$, $\theta 2$ from the motor voltage or current.

ECU 30 includes a CPU (Central Processing Unit), a storage device, and an input/output buffer (they are not shown), and controls each of the devices of vehicle 100. Control of them is not limited to processing by software and may be carried out by dedicated hardware (electronic circuitry).

A typical function of ECU 30 is as follows. Based on input torque command values TR1, TR2, DC voltage VB detected by voltage sensor 10, DC current IB detected by current sensor 11, system voltage VM detected by voltage sensor 13, motor currents MCRT1, MCRT2 from current sensors 24, 25, rotational angles $\theta 1$, $\theta 2$ from rotational angle sensors 26, 27, and the like, ECU 30 controls the operations of converter 12 and inverter 23 so that motor generators MG1, MG2 output respective torques in accordance with torque command values TR1, TR2. Specifically, ECU 30 generates switching control signals PWC, PWI1, PWI2 and outputs them to converter 12 and inverter 23 for controlling converter 12 and inverter 23 in the above-described manner.

When converter 12 performs a voltage step-up operation, ECU 30 performs feedback control on system voltage VM, and generates switching control signal PWC so that system voltage VM is equal to a voltage command value.

When vehicle 100 switches into a regenerative braking mode, ECU 30 generates switching control signals PWI1, PWI2 and outputs them to inverter 23 so that an AC voltage generated by motor generators MG1, MG2 is converted into a DC voltage. Thus, inverter 23 converts the AC voltage generated by motor generators MG1, MG2 into a DC voltage and supplies it to converter 12.

Further, when vehicle 100 switches into the regenerative braking mode, ECU 30 also generates switching control signal PWC and outputs it to converter 12 so that the DC voltage supplied from inverter 23 is stepped down. In this way, the AC voltage generated by motor generators MG1, MG2 is converted into a DC voltage and further stepped down to be supplied to power storage device 28.

Figure 2:
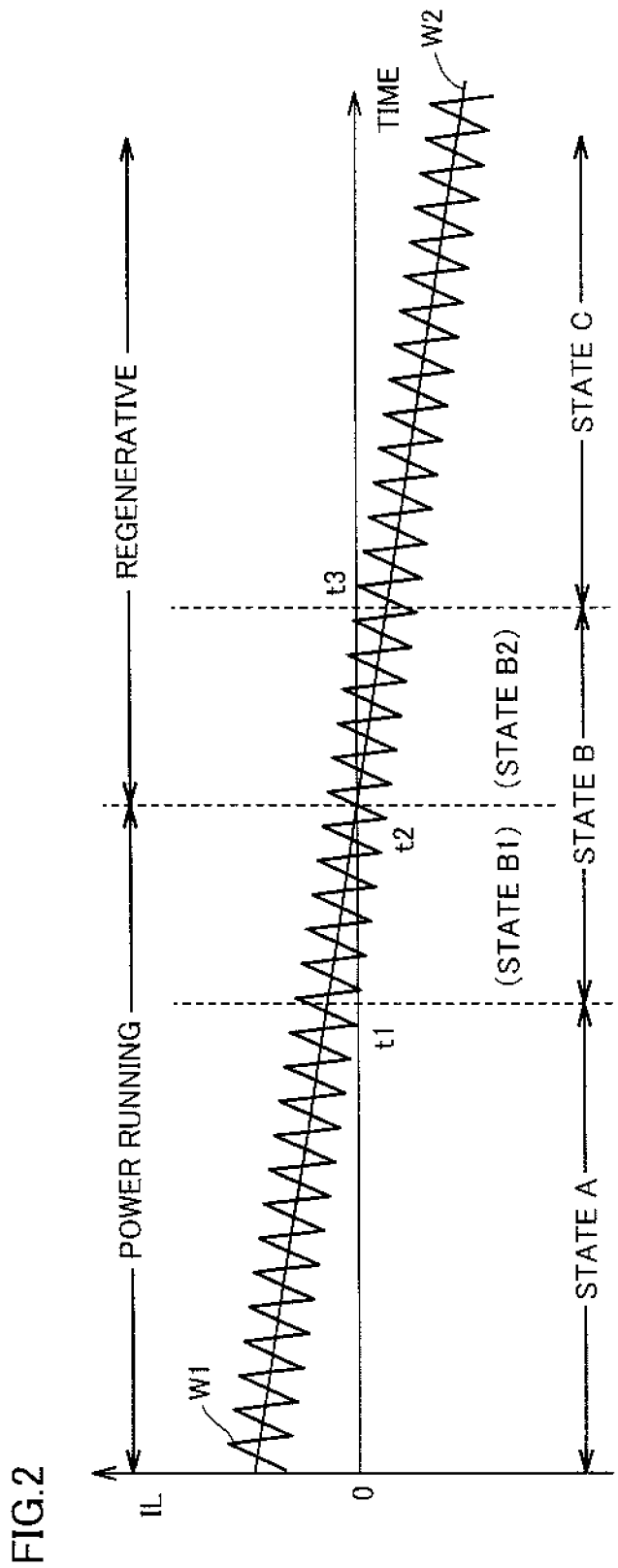
FIG. 2 is a diagram for illustrating a change with time of a reactor current IL flowing through a reactor L1, when reactor current IL changes from a positive value through zero to a negative value.

FIG. 2 is a diagram for illustrating a change with time of a reactor current IL when reactor current IL flowing through reactor L1 changes from a positive value through zero to a negative value, where the current discharged from power storage device 28 is expressed as a positive value.

A waveform W1 in FIG. 2 represents reactor current IL including pulsation of the current (ripple current) that results from switching of switching elements Q1, Q2. A waveform W2 represents a reactor average current ILA determined by averaging reactor current IL along the time axis to remove the influence of the ripple current.

In FIG. 2, the state where reactor average current ILA is positive corresponds to a power running state in which electric power from power storage device 28 is used to drive motor generators MG1, MG2, and the state where reactor average current ILA is negative corresponds to a regenerative state in which electric power generated by motor generators MG1, MG2 is used to charge power storage device 28. Depending on the traveling condition of vehicle 100, motor generators MG1, MG2 may have respective states (power running, regenerative) different from each other. This is the case for example where motor generator MG1 is in the regenerative state to generate electric power while motor generator MG2 is in the power running state to drive the drive wheels 42. Thus, in the following description of the present embodiment, the case where electric power is supplied from power storage device 28 to load device 45 will generically be referred to as power running state, and the case where electric power generated by load device 45 charges power storage device 28 will generically be referred to as regenerative state.

The states of reactor current IL are roughly classified into three states, states A to C. State A is a state where reactor current IL is always positive regardless of whether it is a ripple current or not, and is a state to time t1 in FIG. 2. On the contrary, State C is a state where reactor current IL is always negative regardless of whether it is a ripple current or not, and is a state from time t3 in FIG. 2. State B is a state where reactor current IL in the form of a ripple current changes from the positive state to the negative state or from the negative state to the positive state in one switching period (state from time t1 to time t3 in FIG. 2). State B is further classified into a state where reactor average current ILA is positive (State B1), and a state where reactor average current ILA is negative (State B2).

Next, FIGS. 3 to 6 are time charts for illustrating changes with time of reactor current IL and switching elements Q1, Q2 in respective steady states of above-described State A, State B (State B1, State B2), and State C. In each drawing, the upper stage shows reactor current IL and the lower stage shows respective operating states of switching elements Q1, Q2. The broken line in the upper stage of each drawing represents reactor average current ILA.

Figure 3:
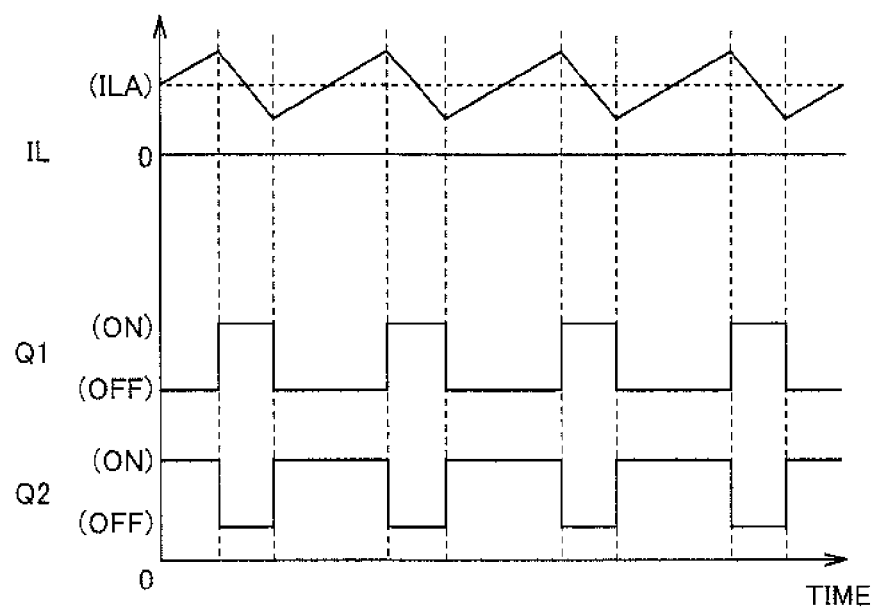
FIG. 3 is a time chart for illustrating changes with time of reactor current IL and switching elements Q1, Q2 in the case of a steady state in State A.

Referring to FIGS. 1 and 3, State A corresponds to a case where a large current is necessary for accelerating vehicle 100 for example (high load). In State A, where switching element Q2 is ON (switching element Q1 is OFF), the current flows through electric power line PL1, reactor L1, and switching element Q2 to ground line NL. At this time, current IL flowing through reactor L1 gradually increases according to the reactance, and energy according to reactor current IL is stored in reactor L1.

Then, switching element Q2 is turned OFF (switching element Q1 is turned ON), and the energy stored in reactor L1 is superimposed on power supply voltage VB of power storage device 28 and supplied to inverter 14. In this way, power supply voltage VB is stepped up to system voltage VM. At this time, the current flows via diode D1 to electric power line PL2. Accordingly, reactor current IL decreases as the energy is discharged.

Figure 7:
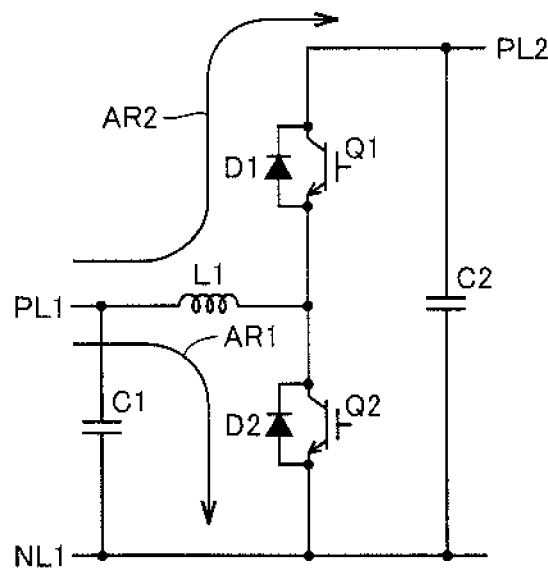
FIG. 7 is a diagram showing the direction of a current flowing through reactor L1 in State A.

FIG. 7 is a diagram showing the direction of the current flowing through reactor L1 in state A. Referring to FIGS. 3 and 7, while switching element Q2 is ON, the current flows as indicated by an arrow AR1 in FIG. 7 and energy is accumulated in reactor L1. Then, while switching element Q2 is OFF, the current flows as indicated by an arrow AR2 in FIG. 7, and the energy accumulated in reactor L1 is released.

Figure 4:
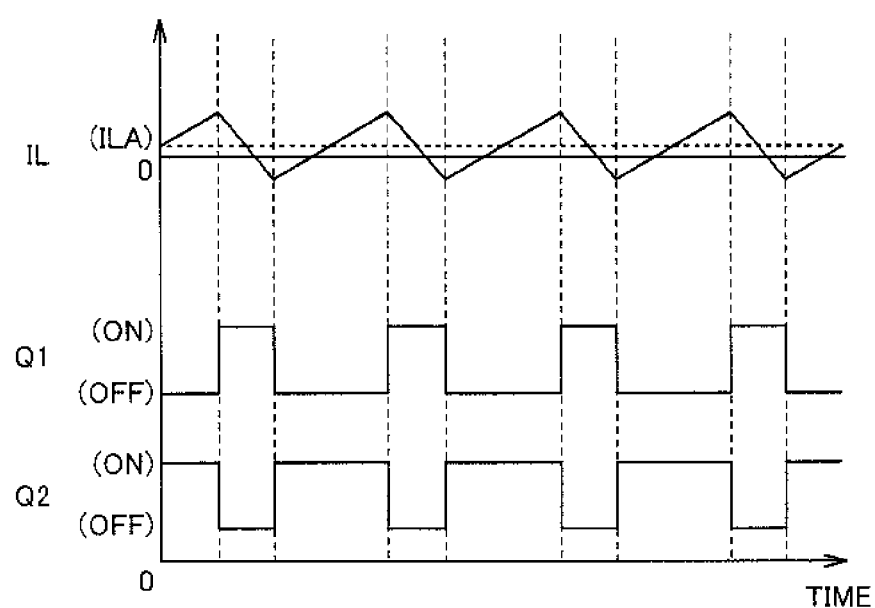
FIG. 4 is a time chart for illustrating changes with time of reactor current IL and switching elements Q1, Q2 in the case of a steady state in State B1.
Figure 8:
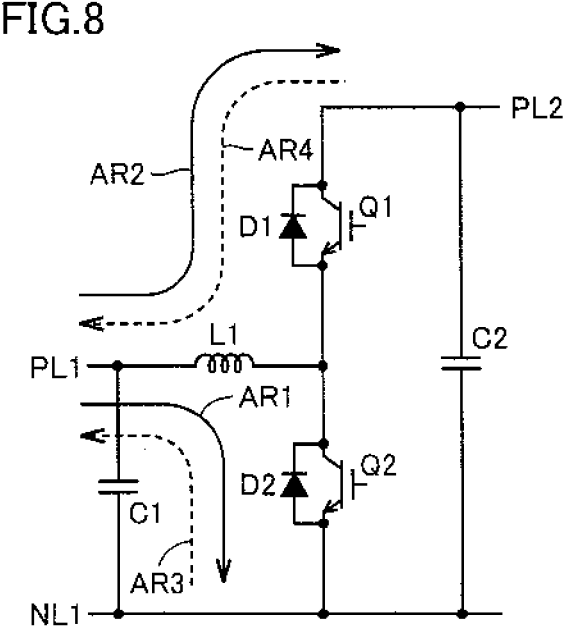
FIG. 8 is a diagram showing the direction of a current flowing through reactor L1 in State B.

FIGS. 4 and 8 will be used next to describe State B1. FIG. 8 is a diagram showing the direction of the current flowing through reactor L1 in State B. State B1 corresponds to the power running state where reactor average current ILA is positive, while it is a low-load state where the current is relatively smaller than State A. For example, this is the case where vehicle 100 is driven at a high constant speed.

Referring to FIGS. 4 and 8, while switching element Q2 is ON (switching element Q1 is OFF), energy is accumulated in reactor L1 and, while switching element Q2 is OFF (switching element Q1 is ON), the energy accumulated in reactor L1 is released, as described above regarding State A.

In State B1, the energy accumulated in reactor L1 is smaller than that of State A. Immediately after switching element Q2 is turned OFF (switching element Q1 is turned ON), the current flows from reactor L1 via diode D1 toward electric power line PL2 in the direction as indicated by a solid-line arrow AR2 in FIG. 8. When release of the energy accumulated in reactor L1 is completed, the current flows from electric power line PL2 via switching element Q1 to reactor L1 in the opposite direction (negative) as indicated by a broken-line arrow AR4 in FIG. 8.

Subsequently, immediately after switching element Q2 is turned ON (switching element Q1 is turned OFF), the current flows from ground line NL via diode D2 toward electric power line PL1 as indicated by a broken-line arrow AR3 in FIG. 8, until the energy in the negative direction accumulated in reactor L1 by the above-described negative current has been released. When release of the energy in the negative direction accumulated in reactor L1 is completed, the current then flows as indicated by solid-line arrow AR1 in FIG. 8 and accordingly energy in the positive direction is accumulated in reactor L1 like State A.

Thus, in State B1, the current flowing through reactor L1 switches from positive to negative or from negative to positive while switching elements Q1, Q2 are operating.

Figure 5:
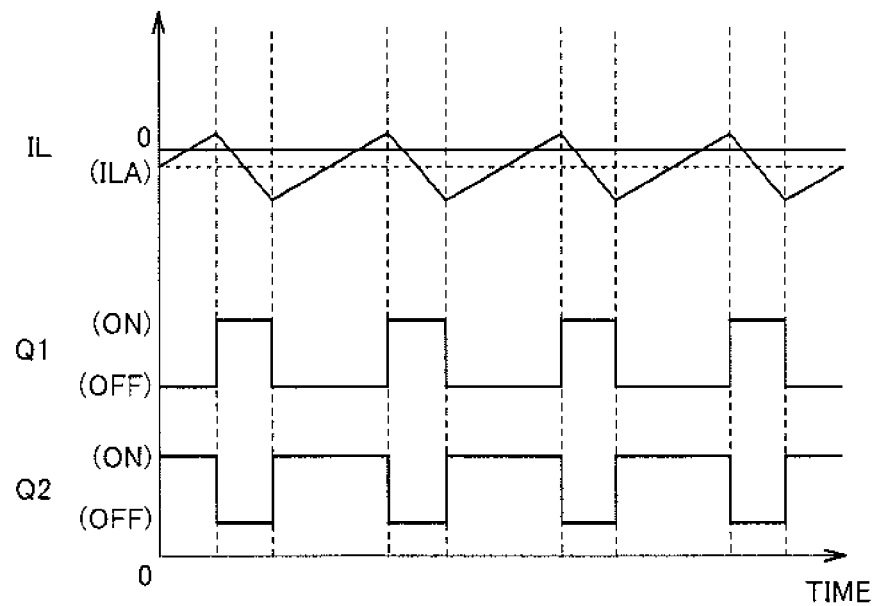
FIG. 5 is a time chart for illustrating changes with time of reactor current IL and switching elements Q1, Q2 in the case of a steady state in State B2.

State B2 shown in FIG. 5 is similar to State B1 except that reactor average current ILA is negative, namely the regenerative state. In State B2, while switching elements Q1, Q2 are operating, the current flowing through reactor L1 switches from positive to negative or from negative to positive. Thus, the detailed description will not be repeated.

Figure 6:
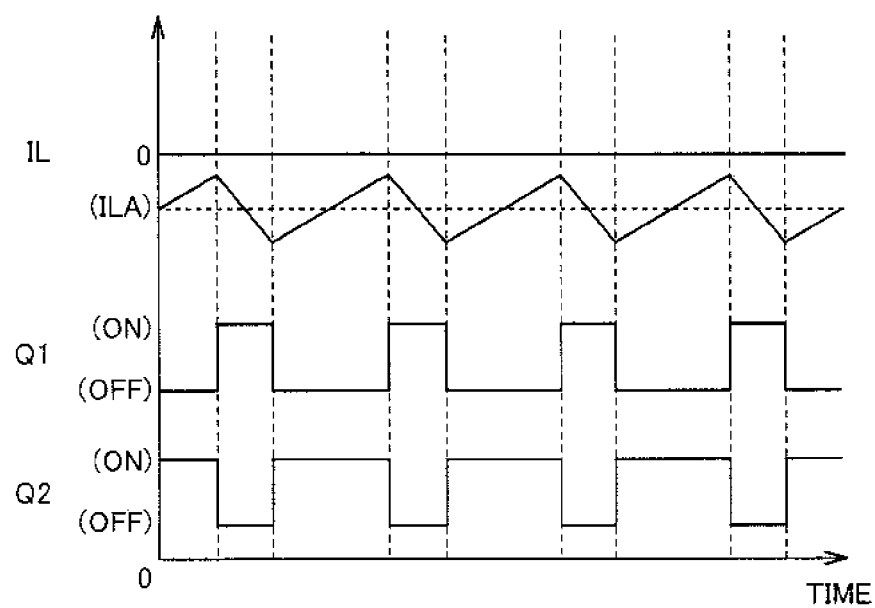
FIG. 6 is a time chart for illustrating changes with time of reactor current IL and switching elements Q1, Q2 in the case of a steady state in State C.
Figure 9:
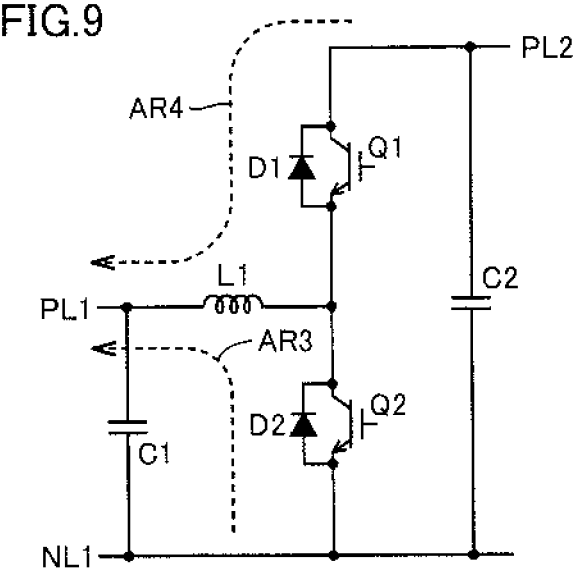
FIG. 9 is a diagram showing the direction of a current flowing through reactor L1 in State C.

Next, FIGS. 6 and 9 are used to describe State C, namely the case of the regenerative state. In this case, vehicle 100 is decelerated by a regenerative braking torque, and electric power generated by motor generators MG1, MG2 charges power storage device 28.

Referring to FIGS. 6 and 9, in State C, while switching element Q1 is ON (switching element Q2 is OFF), the current flows from electric power line PL2 via switching element Q1 to electric power line PL1 as indicated by broken-line arrow AR4 in FIG. 9. At this time, energy in the negative direction is accumulated in reactor L1.

Then, switching element Q1 is turned OFF (switching element Q2 is turned ON), and the negative energy accumulated in reactor L1 is released. At this time, the current flows from ground line NL via diode D2 to electric power line PL1 as indicated by broken-line arrow AR3 in FIG. 9.

As seen from the description above, in State A in an OFF period of switching element Q2 (ON period of switching element Q1), the current always flows via diode D1 to electric power line PL2. Therefore, in State A, even if switching element Q1 is stopped from being driven and only switching element Q2 is driven, the voltage step-up operation can be carried out in a similar manner to that in FIG. 3. In this case, reactor current IL is also similar to that in FIG. 3.

Further, in State C as well, in an ON period of switching element Q2 (an OFF period of switching element Q1), the current always flows via diode D2 to electric power line PL1. Therefore, even if switching element Q2 is stopped from being driven, reactor current IL is similar to that in FIG. 6.

In State B (State B1, State B2), however, the direction of reactor current IL switches from positive to negative or from negative to positive while switching elements Q1, Q2 are operating. Therefore, in order to keep a target current (namely reactor average current ILA) supplied to inverter 23 in the case for example of State B1, it is necessary, for canceling the energy accumulated in reactor L1 by reactor current IL in the negative state, to flow extra reactor current IL in the positive direction. Consequently, the currents that cancel each other result in a useless conduction loss of reactor L1.

In view of the above, single-arm drive control is performed in the first embodiment as follows. In State B where the direction of reactor current IL switches from positive to negative or from negative to positive while switching element Q1 (hereinafter also referred to as "upper arm") or switching element Q2 (hereinafter also referred to as "lower arm") is operating, one of the switching elements is stopped from being driven to prevent the direction of reactor current IL from switching from positive to negative or from negative to positive so as to reduce a conduction loss of reactor L1.

Figure 10:
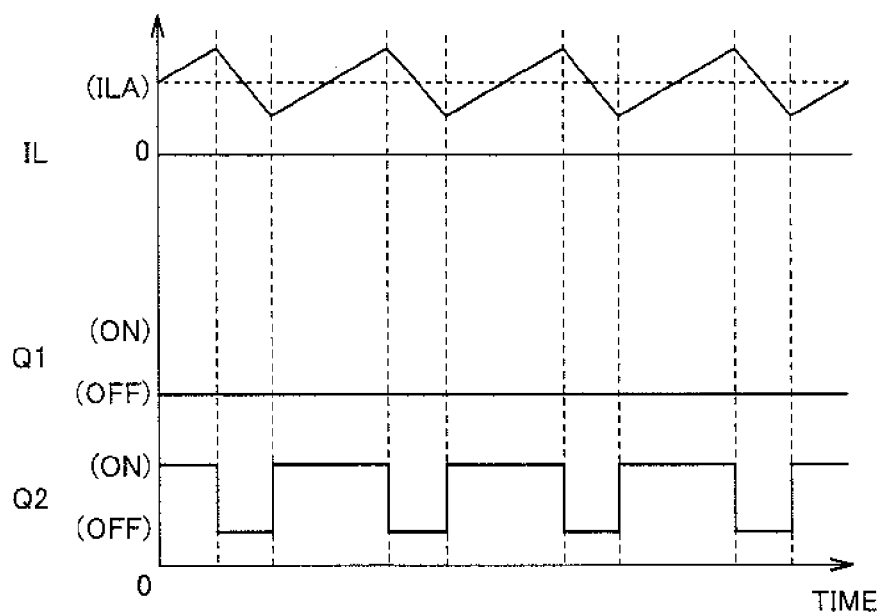
FIG. 10 is a time chart for illustrating changes with time of reactor current IL and switching elements Q1, Q2 in the case where single-arm drive control is applied to State A.
Figure 11:
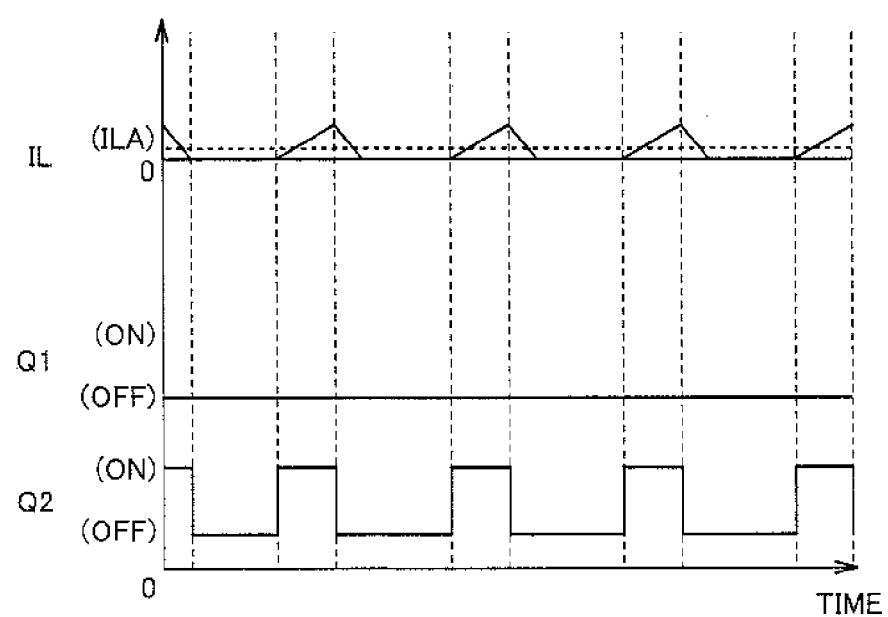
FIG. 11 is a time chart for illustrating changes with time of reactor current IL and switching elements Q1, Q2 in the case where single-arm drive control is applied to State B1.
Figure 12:
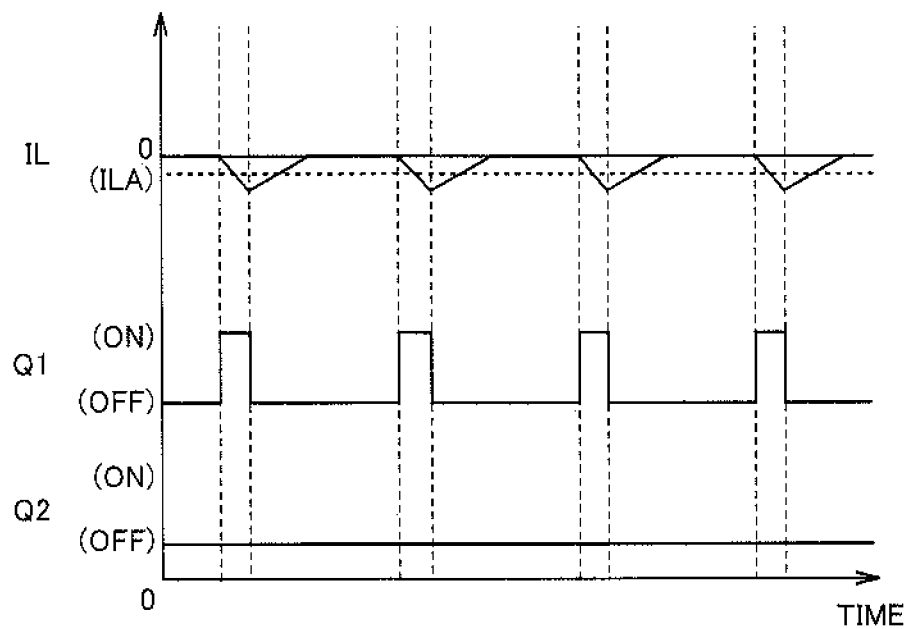
FIG. 12 is a time chart for illustrating changes with time of reactor current IL and switching elements Q1, Q2 in the case where single-arm drive control is applied to State B2.
Figure 13:
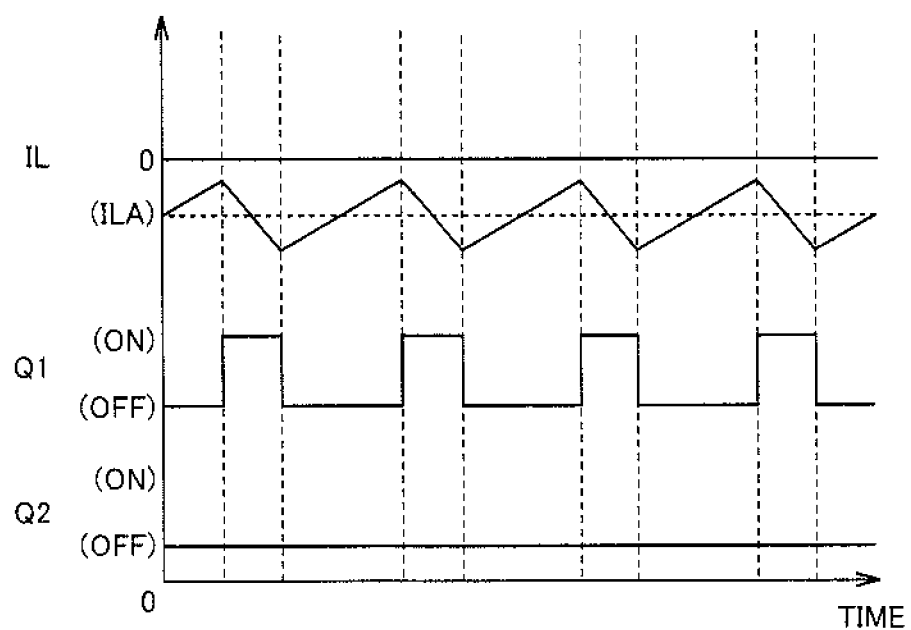
FIG. 13 is a time chart for illustrating changes with time of reactor current IL and switching elements Q1, Q2 in the case where single-arm drive control is applied to State C.

FIG. 10 is a time chart for illustrating changes with time of reactor current IL and switching elements Q1, Q2 in the case where only switching element Q2 is driven in State A (power running state). FIG. 11 is a time chart for illustrating changes with time of reactor current IL and switching elements Q1, Q2 in the case where only switching element Q2 is driven in State B1 (power running state). FIG. 12 is a time chart for illustrating changes with time of reactor current IL and switching elements Q1, Q2 in the case where only switching element Q1 is driven in State B2 (regenerative state). FIG. 13 is a time chart for illustrating changes with time of reactor current IL and switching elements Q1, Q2 in the case where only switching element Q1 is driven in State C (regenerative state).

Referring to FIGS. 10 and 13, in State A of FIG. 10 and State C of FIG. 13, the current flowing through reactor L1 is similar to that in FIGS. 3 and 6 respectively where both of switching elements Q1, Q2 are driven, even if only one switching element (switching element Q2 in State A and switching element Q1 in State C) is driven as described above.

Figure 14:
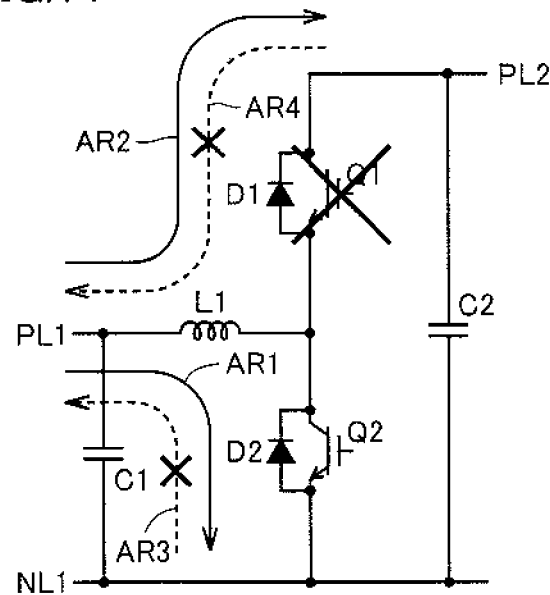
FIG. 14 is a diagram showing the direction of a current flowing through reactor L1 in the case where single-arm drive control is applied to State B1.

In contrast, in State B1, when switching element Q1 is stopped from being driven, the current in the direction of broken-line arrows AR3, AR4, namely the current in the negative direction does not flow through reactor L1 as shown in FIG. 14. Thus, the current in the positive direction of reactor L1 for canceling the current in the negative direction is unnecessary, and accordingly the current in the positive direction of reactor L1 is smaller. Accordingly, the ripple current as a whole is made smaller, and the conduction loss of reactor L1 is therefore reduced.

Figure 15:
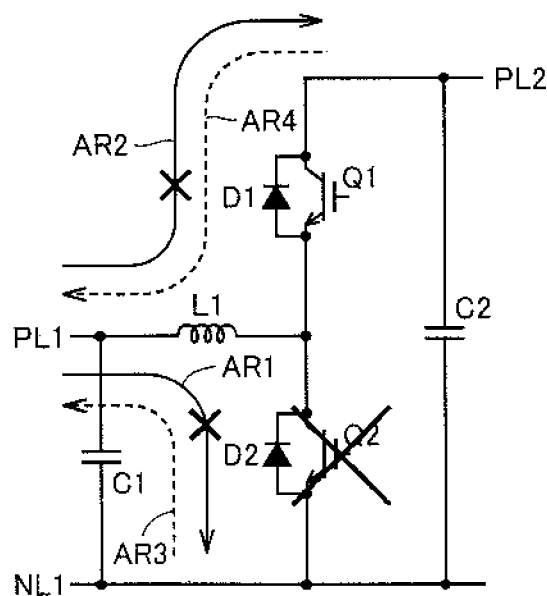
FIG. 15 is a diagram showing the direction of a current flowing through reactor L1 in the case where single-arm drive control is applied to State B2.

In State B2 as well, when switching element Q2 is stopped from being driven, the current in the direction of solid-line arrows AR1, AR2, namely the current in the positive direction does not flow through reactor L1 as shown in FIG. 15. Thus, the ripple current as a whole can be made smaller and the conduction loss of reactor L1 is reduced.

Figure 16:
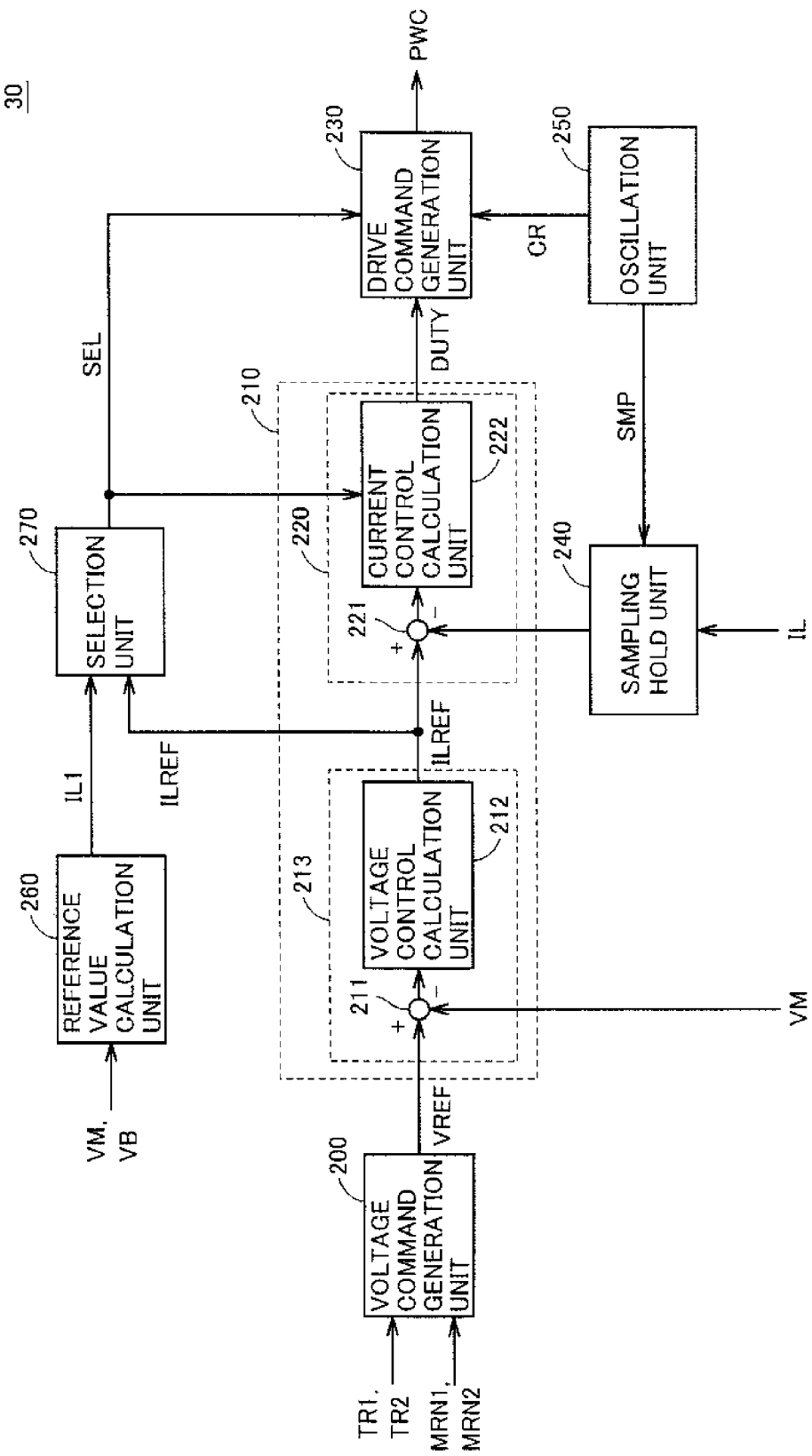
FIG. 16 is a functional block diagram for illustrating single-arm drive control executed by an ECU 30 in the first embodiment.

FIG. 16 is a functional block diagram for illustrating the single-arm drive control executed by ECU 30 in the first embodiment. Each functional block shown in the functional block diagrams described in connection with FIG. 16 and subsequent FIGS. 27, 28, 34, and 37 is implemented by processing in a hardware manner or software manner by ECU 30.

Referring to FIGS. 1 and 16, ECU 30 includes a voltage command generation unit 200, a voltage control unit 210, a drive command generation unit 230, a sampling hold unit 240, an oscillation unit 250, a reference value calculation unit 260, and a selection unit 270. Voltage control unit 210 includes a current command generation unit 213 and a current control unit 220.

Voltage command generation unit 200 receives required torques TR1, TR2 of motor generators MG1, MG2, and rotational speeds MRN1, MRN2 of motor generators MG1, MG2. Based on the information about them, voltage command generation unit 200 generates a voltage command VREF for the output voltage of converter 12 (namely the input voltage of inverter 14).

Current command generation unit 213 includes a subtraction unit 211 and a voltage control calculation unit 212.

Subtraction unit 211 calculates a voltage difference between voltage command VREF that is input from voltage command generation unit 200 and a feedback value VM of the system voltage of converter 12 that is detected by voltage sensor 13, and outputs the result of calculation to voltage control calculation unit 212.

Voltage control calculation unit 212 performs PI operation on the voltage difference calculated by subtraction unit 211 to calculate a reactor current command value ILREF of a current to be flown through reactor L1.

Thus, current command generation unit 213 performs feedback control of the system voltage of converter 12 to calculate reactor current command value ILREF.

Then, voltage control calculation unit 212 outputs this reactor current command value ILREF to current control unit 220 and selection unit 270.

Current control unit 220 includes a subtraction unit 221 and a current control calculation unit 222.

Subtraction unit 221 calculates a current difference between reactor current command value ILREF from voltage control calculation unit 212 and a feedback value of reactor current IL with its detected value held for each switching period by sampling hold unit 240, and outputs the calculation result to current control calculation unit 222.

Current control calculation unit 222 performs PI operation on the current difference calculated by subtraction unit 221 to calculate a duty cycle DUTY of switching elements Q1, Q2. In the case where a selection flag SEL from selection unit 270 described herein later selects the single-arm drive control of switching element Q1 or Q2, current control calculation unit 222 calculates duty cycle DUTY so that reactor current command value ILREF is output by only the selected switching element.

Drive command generation unit 230 generates switching control signal PWC for controlling ON and OFF of switching elements Q1, Q2 that are the upper and lower arms of each phase of converter 12, based on a comparison between duty cycle DUTY from current control calculation unit 222 and a carrier wave CR from oscillation unit 250. At this time, following selection flag SEL from selection unit 270, drive command generation unit 230 selects one of switching elements Q1, Q2 to be driven.

This switching control signal PWC causes the output voltage from power storage device 28 to be stepped up to a desired input voltage of inverter 23 in the case where motor generators MG1, MG2 are in the power running state. When motor generators MG1, MG2 are in the regenerative state, electric power generated by motor generators MG1, MG2 and converted by inverter 23 into DC power is stepped down to a chargeable voltage of power storage device 28.

Oscillation unit 250 outputs carrier wave CR of a predetermined carrier frequency to drive command generation unit 230. Oscillation unit 250 also outputs sampling signal SMP for each period of carrier wave CR to sampling hold unit 240. Each time sampling signal SMP is input, sampling hold unit 240 detects and holds reactor current IL detected by current sensor 18 and outputs the detected current value to subtraction unit 221.

Reference value calculation unit 260 receives output voltage VB of power storage device 28 and system voltage VM. From the information about them, reference value calculation unit 260 calculates a current reference value IL1 of reactor current IL with its direction switching from positive to negative or from negative to positive in one period of carrier wave CR (State B in FIG. 2), and outputs the calculated value to selection unit 270.

Selection unit 270 receives reactor current command value ILREF from voltage control calculation unit 212 and current reference value IL1 from reference value calculation unit 260. Based on the information about them, selection unit 270 selects a switching element to be driven. Then, selection unit 270 outputs selection flag SEL indicating the result of selection, to current control calculation unit 222 and drive command generation unit 230.

Figure 17:
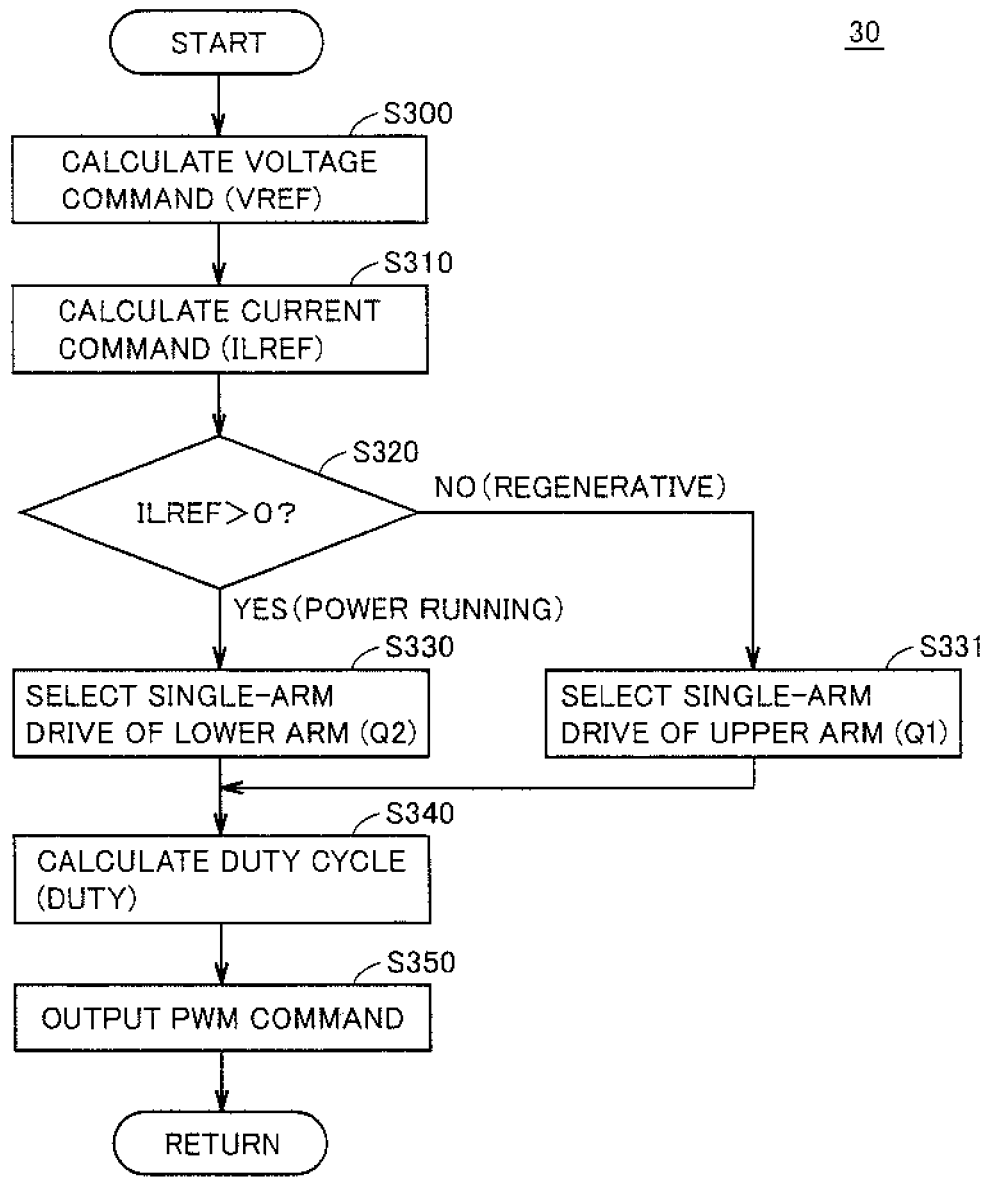
FIG. 17 is a flowchart for illustrating details of a single-arm drive control process executed by ECU 30 in the first embodiment.

FIG. 17 is a flowchart for illustrating details of a single-arm drive control process executed by ECU 30 in the first embodiment. Each step in respective flowcharts shown in FIG. 17 and subsequent FIGS. 22, 29, 31, 35, 36, and 38 is implemented by execution of a program stored in advance in ECU 30 in predetermined cycles. Alternatively, a part of the steps may be implemented by constructing dedicated hardware (electronic circuitry).

Referring to FIGS. 16 and 17, ECU 30 in step (hereinafter step will be abbreviated as S) 300 causes voltage command generation unit 200 to calculate voltage command VREF.

Then, ECU 30 in S310 causes voltage control calculation unit 212 to calculate reactor current command value ILREF.

Next, ECU 30 in S320 determines whether reactor current command value ILREF is positive or not, namely whether motor generators MG1, MG2 are controlled in the power running state or not.

When reactor current command ILREF is positive (YES in S320), ECU 30 in S330 causes selection unit 270 to set the single-arm drive control of switching element Q2 which is the lower arm.

In contrast, when reactor current command ILREF is zero or negative (NO in S320), motor generators MG1, MG2 are controlled in the regenerative state, and therefore, ECU 30 in S331 sets the single-arm drive control of switching element Q1 which is the upper arm. In the case where reactor current command ILREF is zero, voltage conversion by converter 12 is not carried out, and actually the upper and lower arms are not driven.

Next, based on the drive arm set in S330 or S331 and reactor current command value ILREF, ECU 30 causes current control calculation unit 222 to calculate duty cycle DUTY of switching elements Q1, Q2.

Then, ECU 30 in S350 causes drive command generation unit 230 to generate, based on a comparison between duty cycle DUTY of switching elements Q1, Q2 and carrier wave CR, switching control command PWC for driving switching elements Q1, Q2 of converter 12, and outputs the command to converter 12.

In accordance with control command PWC generated through the process as described above, control is executed in such a manner that converter 12 is controlled to cause only the lower arm (switching element Q2) to be driven when motor generators MG1, MG2 are in the power running state and cause only the upper arm (switching element Q1) to be driven when motor generators MG1, MG2 are in the regenerative state. Thus, while the voltage step-up or step-down operation is performed by converter 12, a conduction loss of reactor L1 can be reduced that occurs in the state where the direction of reactor current IL switches from positive to negative or from negative to positive in one period of carrier wave CR. Since only one of switching elements Q1, Q2 is driven, a switching loss of the switching elements can also be reduced. Consequently, a drive loss of converter 12 is reduced and thus the efficiency of converter 12 can be improved.

Modification of First Embodiment

In the above-described first embodiment, based on whether reactor current command value ILREF is positive or not, it is determined which one of switching elements Q1, Q2 is to be driven.

A modification here will be described in which the single-arm drive control is performed only for the range of State B in FIG. 2 in which the single-arm drive control is effective.

Figure 18:
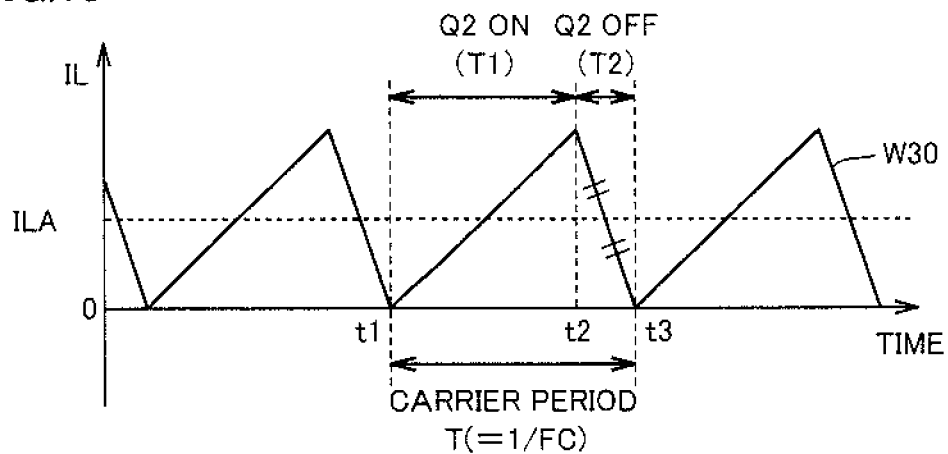
FIG. 18 is a diagram for illustrating a current reference value based on which it is determined whether to start single-arm drive control of a converter in a modification.

FIG. 18 is a diagram for illustrating a current reference value based on which whether to start the single-arm drive control of converter 12 is determined in the modification. In connection with FIG. 18, a description will be given of the power running operation by way of example.

Referring to FIG. 18, the boundary where the direction of reactor current IL switches from positive to negative or from negative to positive is where the minimum value of the ripple current of reactor current IL is zero, as indicated by a waveform W30 in FIG. 18.

At this time, in a carrier period T of carrier wave CR, a time T1 (from time t1 to time t2 in FIG. 18) in which reactor current IL increases is a period for which switching element Q2 is ON (switching element Q1 is OFF), and a time T2 (from time t2 to time t3 in FIG. 18) in which reactor current IL decreases is a period for which switching element Q2 is OFF (switching element Q1 is ON).

Reactor average current ILA is half the peak value of reactor current IL.

Figure 19:
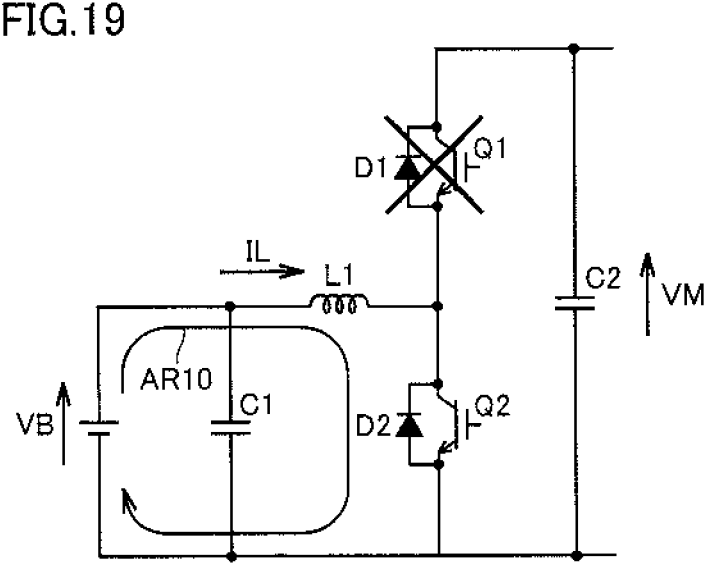
FIG. 19 is a diagram showing the direction of a current flowing in a circuit while switching element Q2 is ON in the modification.

FIG. 19 is a diagram showing the direction in which the current flows in the case where switching element Q2 is ON in the modification.

Referring to FIG. 19, the current in the case where switching element Q2 is ON flows in the direction indicated by an arrow AR10 in FIG. 19. A voltage equation at this time is expressed by Equation (1) below where L represents the reactance of reactor L1.

$$VB - L \cdot (dIL/dt) = 0 \tag{1}$$

Equation (1) may be transformed to express by Equation (2) the rate of change of the current with time, namely dIL/dt, in time T1 in which switching element Q2 is ON.

$$dIL/dt = VB/L \tag{2}$$

Figure 20:
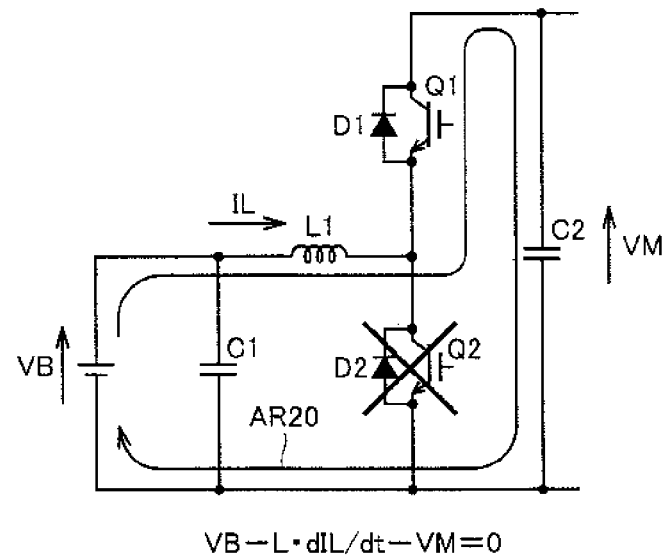
FIG. 20 is a diagram showing the direction of a current flowing in the circuit while switching element Q2 is OFF in the modification.

In contrast, FIG. 20 is a diagram showing the direction in which the current flows in the case where switching element Q2 is OFF in the modification. The current in time T2 in which switching element Q2 is OFF flows in the direction indicated by an arrow AR20 in FIG. 20, and a voltage equation at this time is expressed by Equation (3).

$$VB - L \cdot (dIL/dt) - VM = 0 \tag{3}$$

Equation (3) may be transformed to express by Equation (4) the rate of change of the current with time, namely dIL/dt, in time T2 in which switching element Q2 is OFF.

$$dIL/dt = (VB - VM)/L \tag{4}$$

In the steady state as shown in FIG. 18, the current which increases in time T1 and the current which decreases in time T2 in carrier period T are equal to each other. Therefore, for the change of the current with time in time T1 and that in time T2, Equations (2) and (4) may be used respectively. Then, the relation expressed by Equation (5) holds.

$$T1 \cdot (VB/L) + T2 \cdot \{(VB - VM)/L\} = 0 \tag{5}$$

Further, Equation (5) may be transformed to obtain Equation (6).

$$T2/(T1 + T2) = VB/VM \tag{6}$$

Where the carrier frequency is represented by FC (=1/(T1+T2)), Equation (7) is derived.

$$T2 = VB/(VM \cdot FC) \tag{7}$$

Here, reactor average current ILA at the boundary state in FIG. 18 is the current at the intermediate time between time t2 and time t3, and may be calculated using Equation (4) and Equation (7) as follows.

$$ILA = (-T2/2) \cdot (VB - VM)/L \qquad (8)$$
$$= \{-VB/(2VM \cdot FC)\} \cdot (VB - VM)/L$$
$$= (1 - VB/VM) \cdot (VB/L)/2FC$$

Equation (8) is solved for system voltage VM to obtain Equation (9).

$$VM = VB^2/(VB - 2FC \cdot L \cdot ILA) \qquad (9)$$

The regenerative state where reactor average current ILA is negative may similarly be considered. The relation between system voltage VM and reactor average current ILA at this time that corresponds to Equation (9) may be expressed by Equation (10).

$$VM = VB^2/(VB + 2FC \cdot L \cdot ILA) \qquad (10)$$

Figure 21:
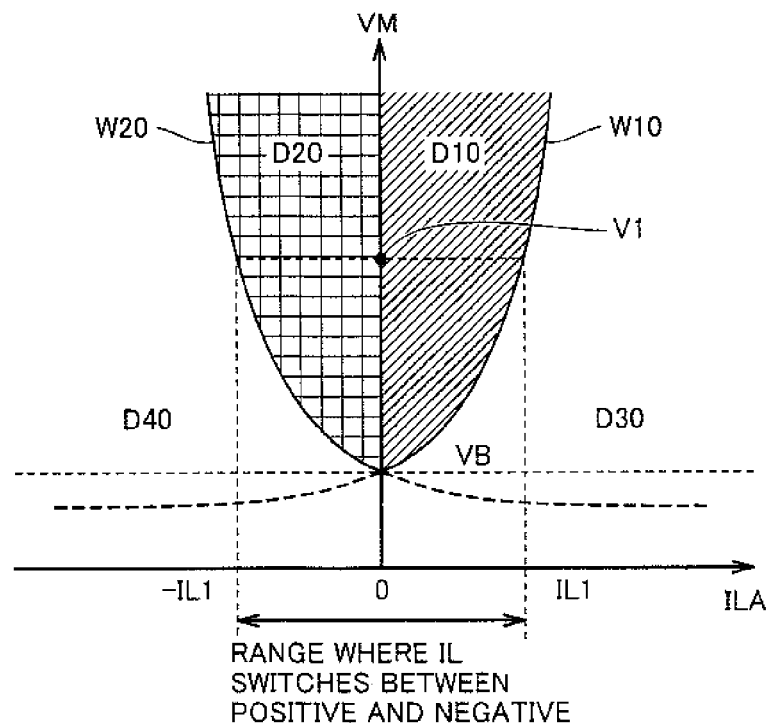
FIG. 21 is a diagram showing a relation between a system voltage VM and a reactor average current ILA in the modification.

FIG. 21 is a diagram showing a relation between system voltage VM and reactor average current ILA in the modification.

The boundary state expressed by Equation (9) in the case where reactor average current ILA is positive corresponds to the solid line portion of a curve W10 in FIG. 21. In one period of carrier wave CR, the direction of reactor current IL switches from positive to negative or from negative to positive in a region D10 of FIG. 21. In contrast, in the case where reactor average current ILA is negative, the boundary state expressed by Equation (10) corresponds to the solid line portion of a curve W20 in FIG. 21. In one period of carrier wave CR, the direction of reactor current IL switches from positive to negative or from negative to positive in a region D20 of FIG. 21.

As shown in FIG. 21, in the case for example where system voltage VM is VM V1 shown in FIG. 21, the direction of reactor current IL switches from positive to negative or from negative to positive in one period of carrier wave CR when reactor average current ILA is in the range from −IL1 to IL1 (−IL1<ILA<IL1) in FIG. 21.

Thus, based on system voltage VM detected by voltage sensor 13, ECU 30 can refer to the map as shown in FIG. 21 to calculate current reference value IL1 based on which whether to perform the single-arm drive control is determined. ECU 30 then makes a comparison between reactor current command value ILREF and current reference value IL1. In the case where reactor current command value ILREF is in region D10 or D20 of FIG. 21, the single-arm drive control is selected. In contrast, in the case where reactor current command value ILREF is in region D30 or D40 of FIG. 21, dual-arm drive control is selected. Thus, in the case where the direction of reactor current IL switches from positive to negative or from negative to positive in one period of carrier wave CR, the single-arm drive control can be selected.

Current reference value IL1 may also be calculated by using an equation as described above, rather than by referring to the map. Further, current reference value IL1 may be determined in consideration of stability for example when switch is made from the dual-aim drive control to the single-arm drive control.

Figure 22:
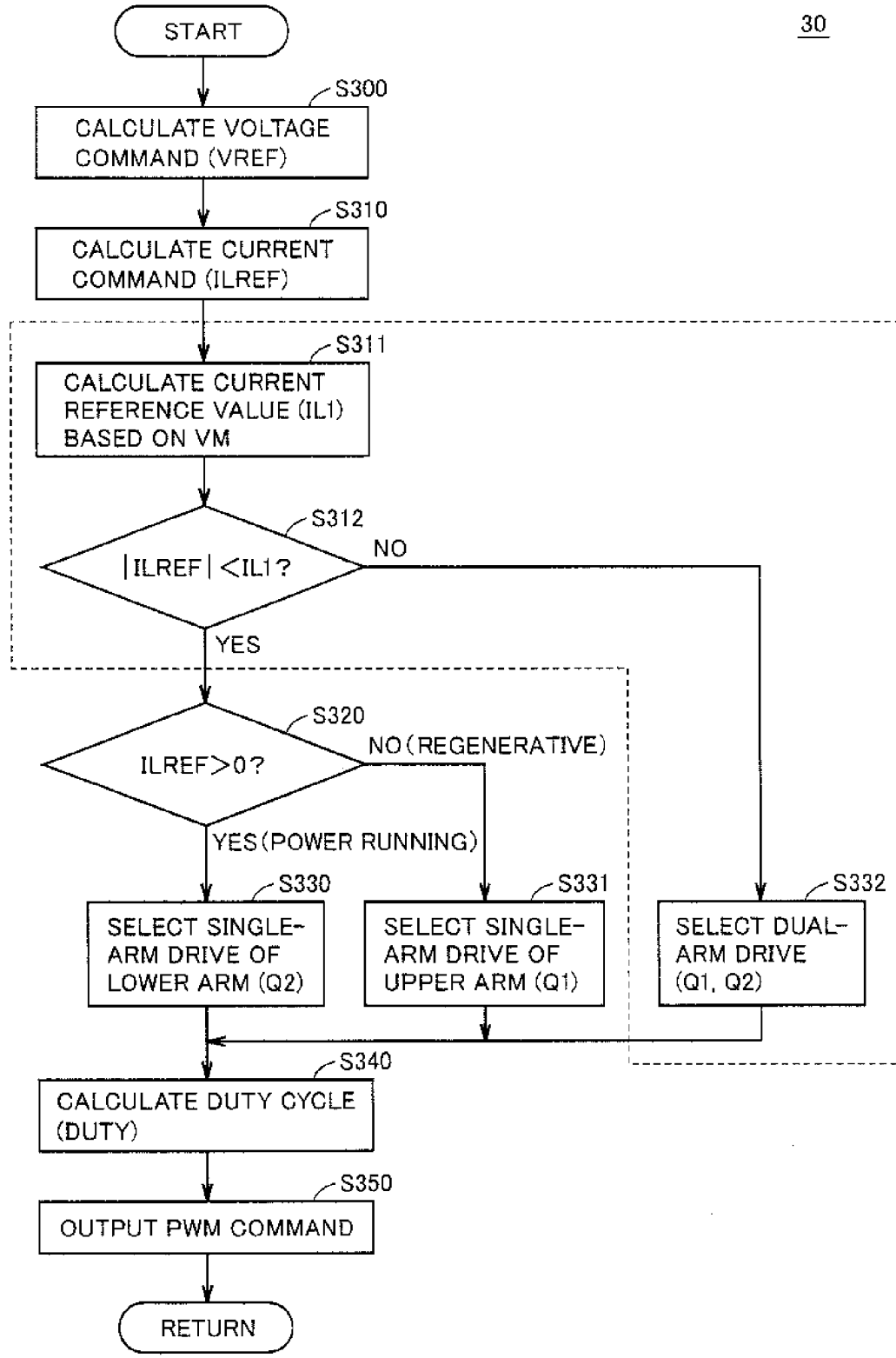
FIG. 22 is a flowchart for illustrating details of a single-arm drive control process in the modification.

FIG. 22 is a flowchart for illustrating details of the single-arm drive control process in the modification. FIG. 22 corresponds to the flowchart shown in FIG. 17 of the first embodiment except that steps S311, S312, and S332 are added. The description of the steps common to FIG. 22 and FIG. 17 will not be repeated.

Referring to FIG. 22, ECU 30 calculates reactor current command value ILREF in S310, and subsequently proceeds to S311.

Then, in S311, ECU 30 refers to the map as shown in FIG. 21 based on system voltage VM detected by voltage sensor 13 to calculate current reference value IL1 based on which the single-arm drive control is to be performed.

Then, in S312, ECU 30 determines whether reactor current command value ILREF falls in the range of ±IL1 (−IL1<ILREF<IL1), namely whether to perform the single-arm drive control.

In the case where reactor current command value ILREF falls in the range of ±IL1, namely the single-arm drive control is to be performed (YES in S312), the process proceeds to S320. Subsequently, the process similar to that in the first embodiment is followed to perform the single-arm drive control for the upper arm or the lower arm.

In contrast, in the case where reactor current command value ILREF is out of the range of ±IL1, namely in the case where the dual-arm drive control is to be performed (NO in S312), the process proceeds to S332 and ECU 30 selects the dual-arm drive control using both of switching elements Q1, Q2. After this, duty cycle DUTY of switching elements Q1, Q2 is calculated (S340), and control command PWC is generated in accordance with calculated duty cycle DUTY, and the control command is output to converter 12 (S350).

The control is carried out following the process as described above and accordingly the single-arm drive control can be performed in the state where the direction of reactor current IL switches from positive to negative or from negative to positive in one period of carrier wave CR.

Second Embodiment

As described above in connection with the first embodiment and its modification, in the range of State B in FIG. 2, namely the range where the direction of reactor current IL switches from positive to negative or from negative to positive in one period of carrier wave CR (the range of −IL1<ILA<IL1 in the modification), a change in duty cycle of switching element Q1 or Q2 is relatively larger than that of State A or State C in FIG. 2.

Figure 23:
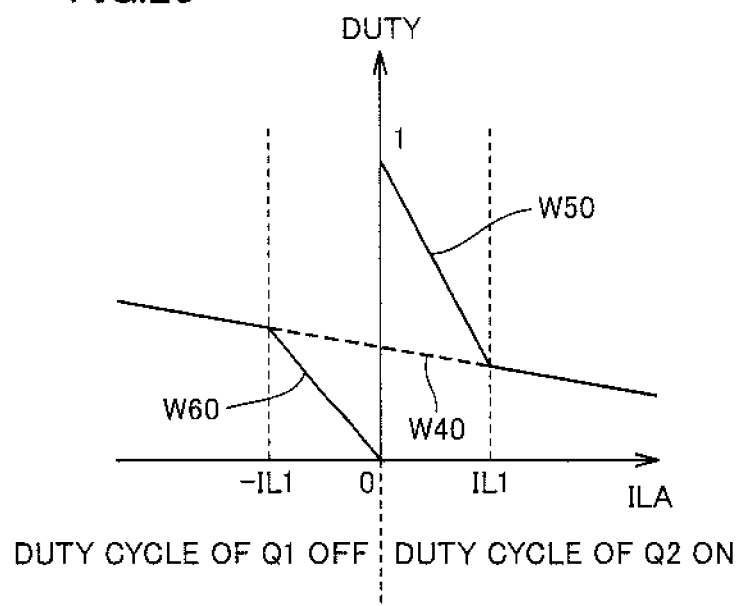
FIG. 23 is a diagram illustrating a relation between a reactor current command value ILREF and a duty cycle DUTY in the case where single-arm drive control is performed and the case where dual-arm drive control is performed.

FIG. 23 is a diagram illustrating a relation between reactor current command value ILREF and duty cycle DUTY in the case where the single-arm drive control is performed and the case where the dual-arm drive control is performed. In FIG. 23, since one of the switching elements is stopped from being driven when the single-arm drive control is performed, the duty cycle is shown to represent the ratio of the ON state of switching element Q2 when reactor control command value ILREF is positive (namely power running state), and represent the ratio of the OFF state of switching element Q1 when reactor control command value ILREF is negative (namely regenerative state).

Referring to FIG. 23, a relation between reactor current command value ILREF and duty cycle DUTY in the case of the dual-arm drive control is indicated by a broken line W40. In this case, the duty cycle DUTY changes along a continuous straight line over the whole range of reactor current command value ILREF.

In contrast, a relation between reactor current command value ILREF and duty cycle DUTY in the case of the single-arm drive control is indicated by solid lines W50 and W60. In this case, in the range where the direction of reactor current command value ILREF switches from positive to negative or from negative to positive in one period of carrier wave CR ($-IL1<ILREF<IL1$), a change of duty cycle DUTY is larger than that of the dual-arm drive control.

Figure 24:
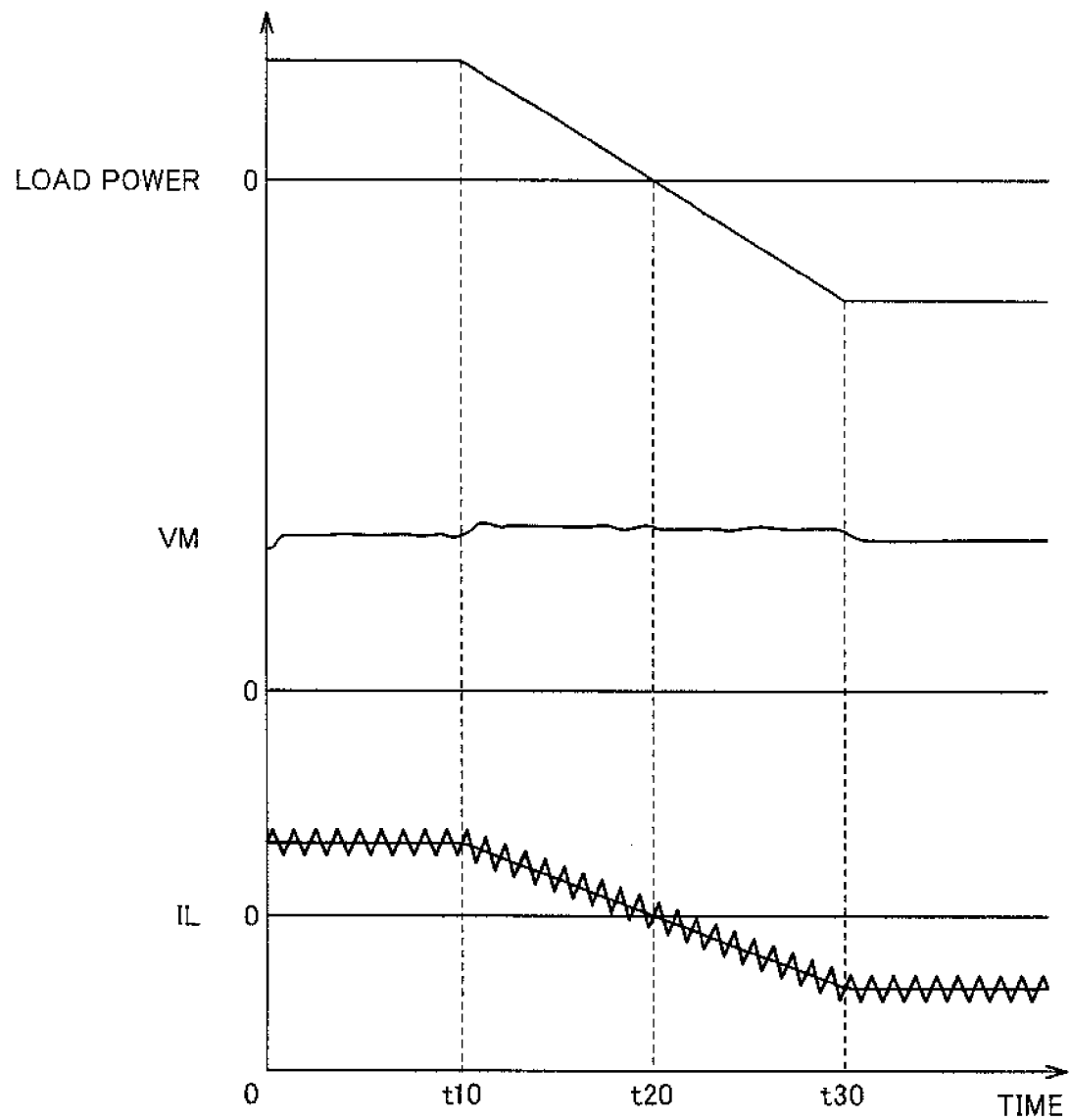
FIG. 24 is a diagram showing an example of changes with time of system voltage VM and reactor current IL in the case where single-arm drive control is not applied.
Figure 25:
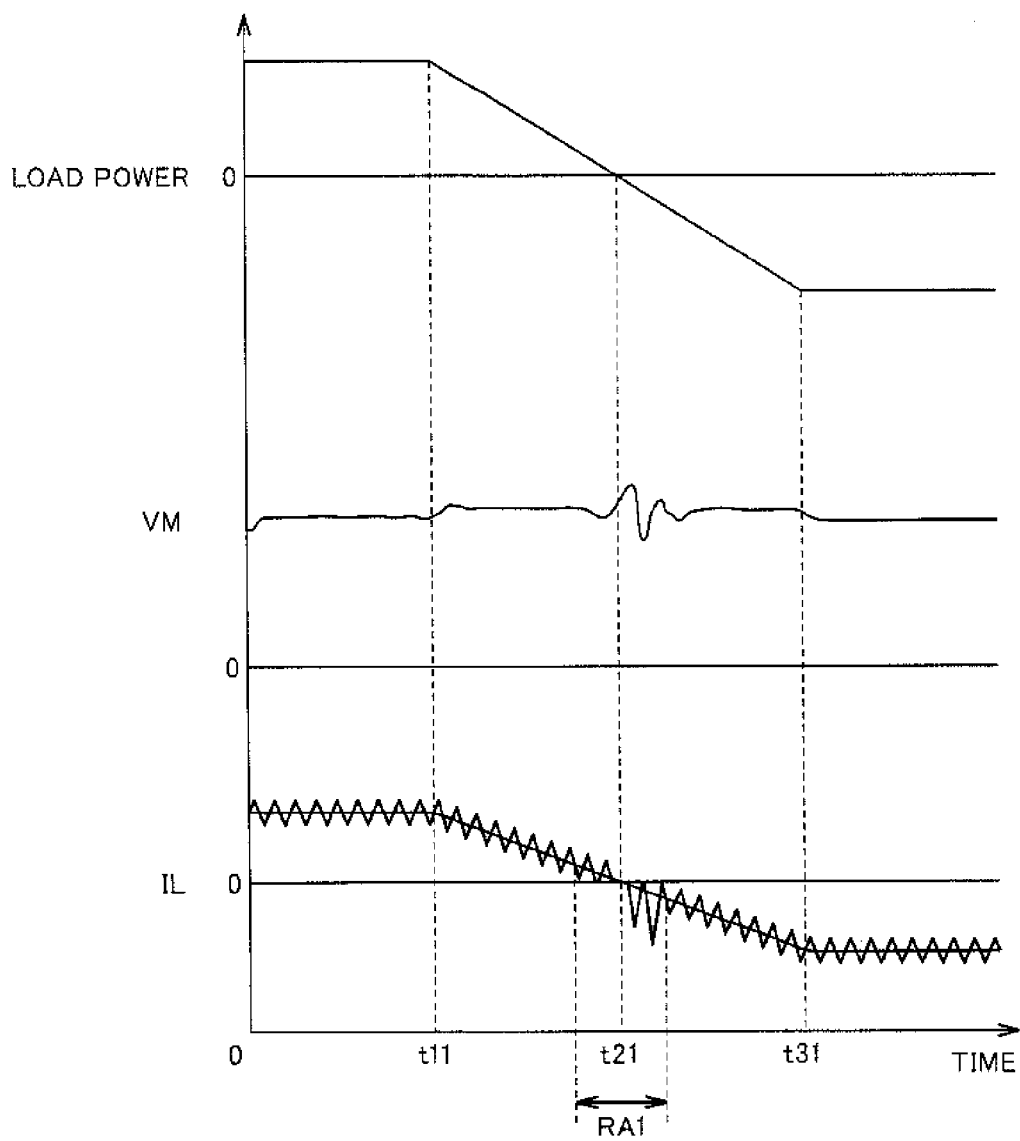
FIG. 25 is a diagram showing an example of changes with time of system voltage VM and reactor current IL in the case where single-arm drive control is applied.

FIGS. 24 and 25 show examples of changes with time of system voltage VM and reactor current IL when the load power is changed from the power running state to the regenerative state in the case where the single-arm drive control is applied and the case where it is not applied.

FIG. 24 is a diagram showing an example of changes with time of system voltage VM and reactor current IL in the case where the single-arm drive control is not applied. In this case, in the period from time t10 to time t30 in which the load power varies, system voltage VM is almost constant and stable.

FIG. 25 shows an example of changes with time of system voltage VM and reactor current IL in the case where the single-arm drive control is applied. In this case, in the range of RA1 in FIG. 25 around time t21 at which reactor current IL changes through zero, the single-arm drive control causes negative reactor current IL to become to zero before time t21, and causes positive reactor current IL to become zero after time t21.

Here, at time t21 when the switching element driven is switched, system voltage VM changes to a large extent in an oscillating manner. This is for the following reasons. As shown in FIG. 23, in the range where the direction of reactor current command value ILREF switches from positive to negative or from negative to positive in one period of carrier wave CR, duty cycle DUTY has to be changed to a large extent, while the feedback control of current control calculation unit 222 in FIG. 16 cannot follow the change of duty cycle DUTY.

Accordingly, switching elements Q1 to Q8 of converter 12 and inverter 14 have overvoltages, which may result in a failure, or cause the protection capability of the system to stop control of converter 12 and inverter 14.

In view of the above, control in the second embodiment is carried out in the following manner. In the first embodiment, the single-arm drive control is performed in the range where the direction of reactor current command value ILREF switches from positive to negative or from negative to positive in one period of carrier wave CR. Here, the second embodiment performs control for suppressing a variation of system voltage VM by changing the gain of the PI control of current control calculation unit 222 in FIG. 16 to a high gain.

Figure 26:
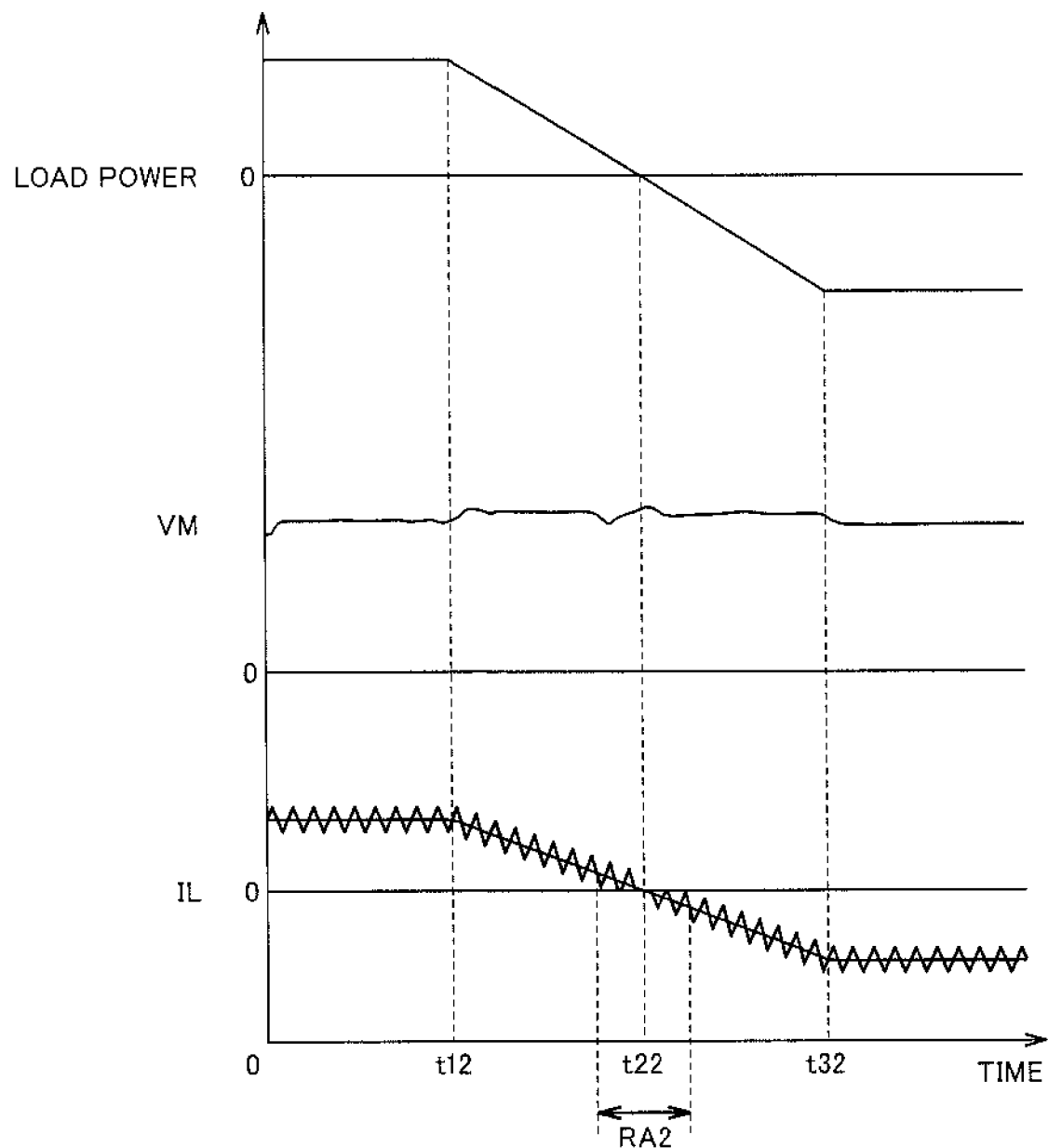
FIG. 26 is a diagram showing an example of changes with time of a load power, system voltage VM, and reactor current IL in the case of single-arm drive control to which a second embodiment is applied.

FIG. 26 is a diagram showing an example of changes with time of the load current, system voltage VM, and reactor current IL in the case of the single-arm drive control to which the second embodiment is applied. As shown in FIG. 26, the control of the second embodiment is applied to suppress an oscillating variation of system voltage VM around time t22 at which reactor current IL changes through zero.

Figure 27:
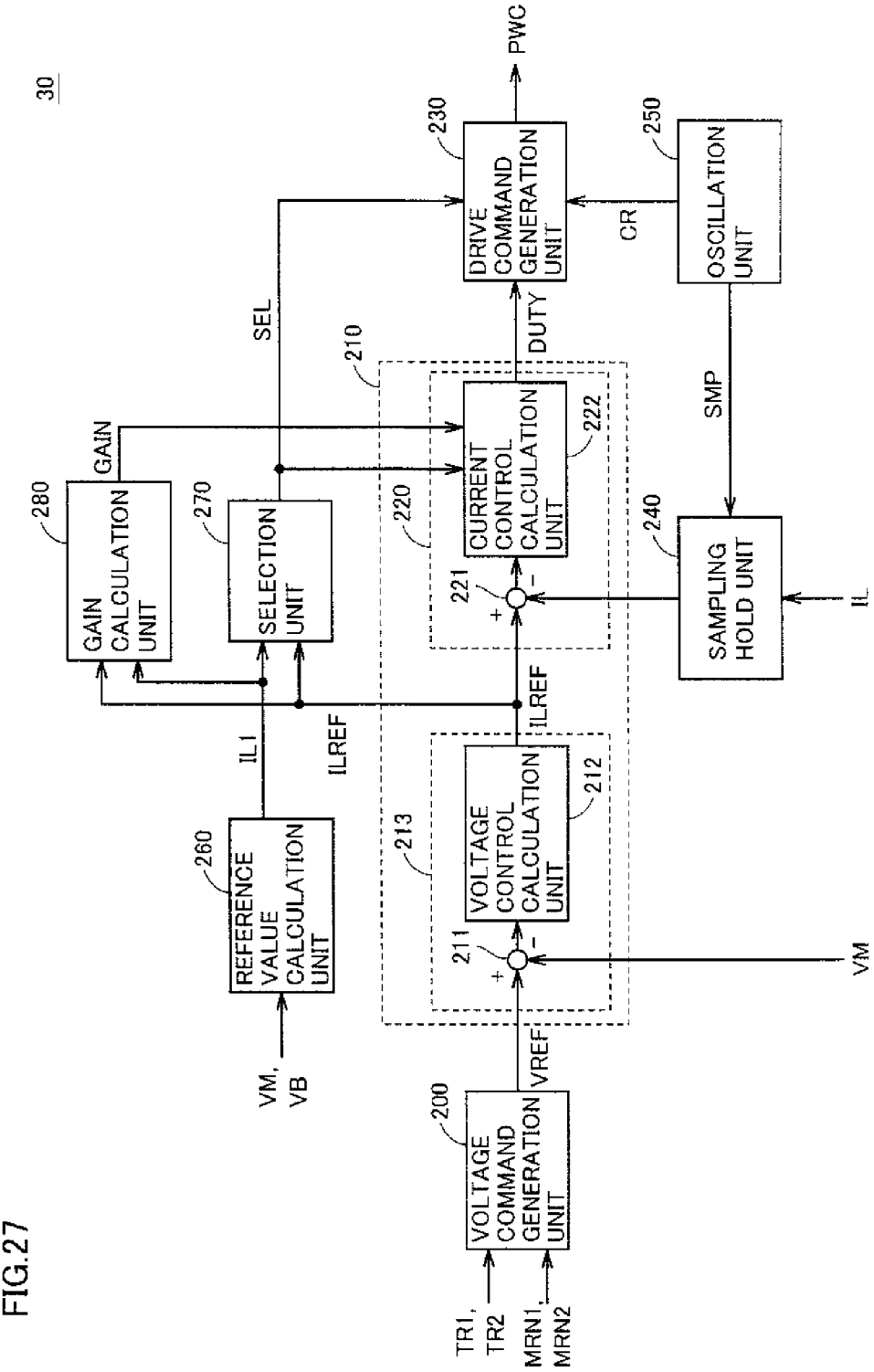
FIG. 27 is a functional block diagram for illustrating single-arm drive control executed by the ECU in the second embodiment.

FIG. 27 is a functional block diagram for illustrating the single-arm drive control executed by ECU 30 in the second embodiment. FIG. 27 differs from the functional block diagram of the first embodiment shown in FIG. 16 in that a gain calculation unit 280 is added. The description of the components common to FIG. 27 and FIG. 16 will not be repeated.

Referring to FIG. 27, gain calculation unit 280 receives current reference value IL1 from reference value calculation unit 260 and receives reactor current command value ILREF from voltage control calculation unit 212.

Gain calculation unit 280 then compares reactor current command value ILREF and current reference value IL1 with each other to set a control gain GAIN of current control calculation unit 222, and outputs the set control gain GAIN to current control calculation unit 222.

Using control gain GAIN which is input from gain calculation unit 280, current control calculation unit 222 performs PI control to calculate duty cycle DUTY.

Figure 28:
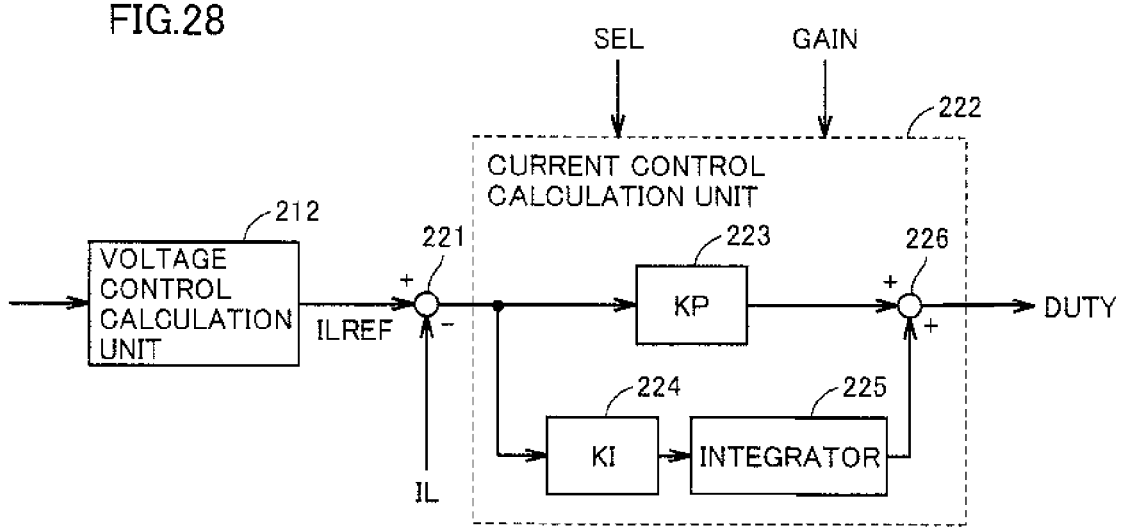
FIG. 28 is a detailed functional block diagram of a current control calculation unit.

FIG. 28 is a detailed functional block diagram of current control calculation unit 222 in FIG. 27. Referring to FIG. 28, current control calculation unit 222 includes a proportion control unit 223, an integration control unit 224, an integrator 225, and an addition unit 226.

Proportion control unit 223 multiplies the current difference calculated by subtraction unit 221 by a proportion gain KP which is set by gain calculation unit 280, and outputs the resultant value to addition unit 226.

Integration control unit 224 multiplies the current difference calculated by subtraction unit 221 by an integration gain KI which is set by gain calculation unit 280, and outputs the resultant value to integrator 225. Integrator 225 integrates the result of calculation that is input from integration control unit 224, and outputs the resultant value to addition unit 226.

Addition unit 226 performs addition of the result of calculation by proportion control unit 223 and the result of calculation by integrator 225 so as to calculate duty cycle DUTY.

Gain calculation unit 280 changes at least one of the above-described proportion gain KP and integration gain KI based on a comparison between reactor current command value ILREF and current reference value ILL for the range where the direction of reactor current command value ILREF switches from positive to negative or from negative to positive in one period of carrier wave CR.

Figure 29:
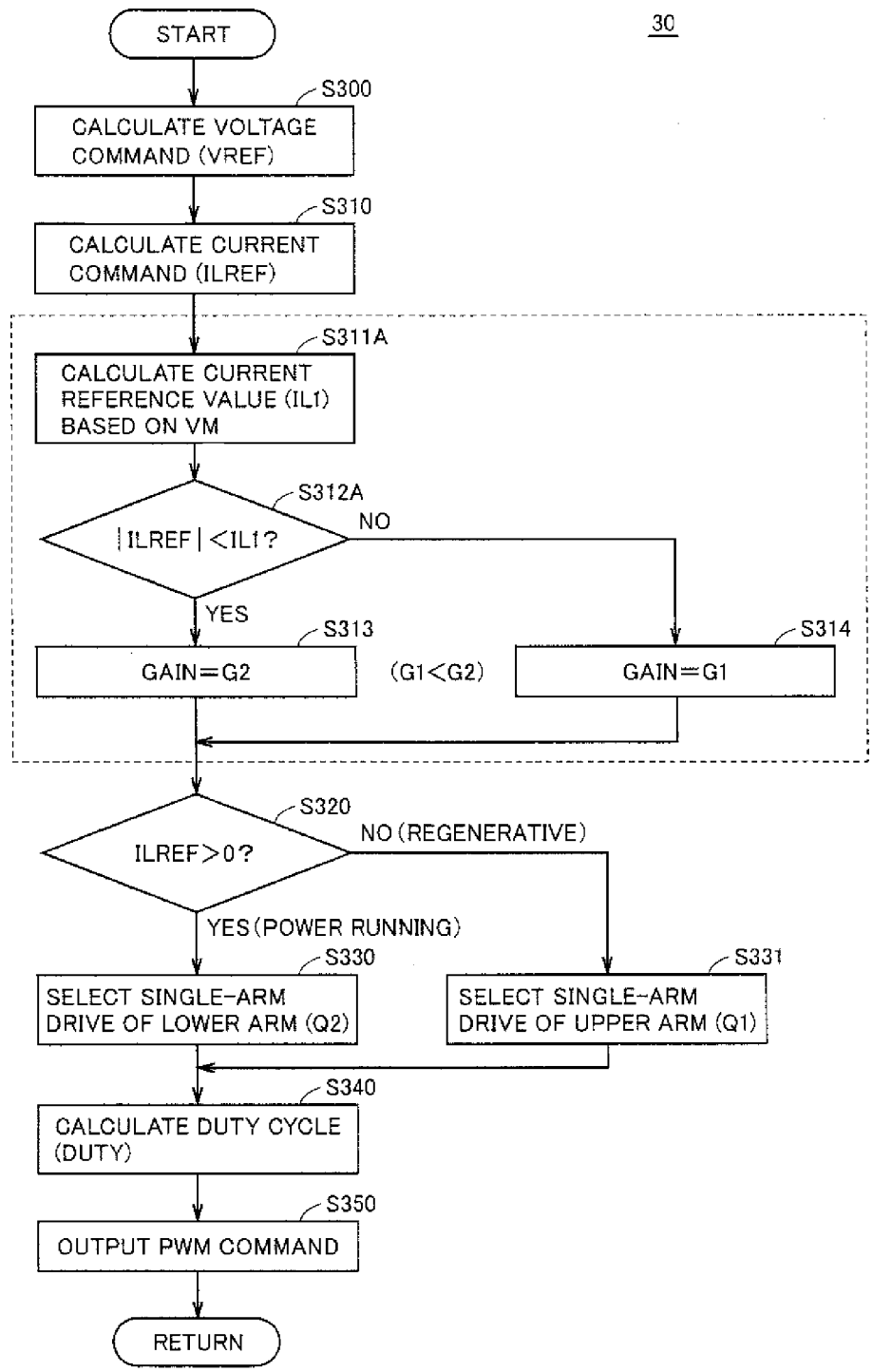
FIG. 29 is a flowchart for illustrating details of a single-arm drive control process executed by the ECU in the second embodiment.

FIG. 29 is a flowchart for illustrating details of a single-arm drive control process executed by ECU 30 in the second embodiment. FIG. 29 differs from the flowchart in the first embodiment shown in FIG. 17 in that steps S311A, S312A, S313, and S314 are added. The description of the steps common to FIG. 29 and FIG. 17 will not be repeated.

Referring to FIGS. 28 and 29, ECU 30 calculates reactor current command value ILREF in S310, and proceeds to S311A in which ECU 30 refers to the map as shown in FIG. 21 based on system voltage VM to calculate current reference value IL1.

Then, ECU 30 determines in S312A, based on a comparison between reactor current command value ILREF and current reference value IL1, whether the reactor current command value is in the range where the direction of reactor current command value ILREF switches from positive to negative or from negative to positive in one period of carrier wave CR.

When the reactor current command value is not in the range where the direction of reactor current command value ILREF switches from positive to negative or from negative to positive in one period of carrier wave CR (NO in S312A), ECU 30 proceeds to S314 to cause gain calculation unit 280 in FIG. 27 to set control gain GAIN to G1, which is used by current control calculation unit 222. At this time, control gain GAIN includes proportion gain KP and integration gain KI. Respective values of proportion gain KP and integration gain KI may be identical to or different from each other.

In contrast, when the reactor current command value is in the range where the direction of reactor current command value ILREF switches from positive to negative or from negative to positive in one period of carrier wave CR, namely duty cycle DUTY changes to a large extent (YES in S312A), the process proceeds to S313. In S313, ECU 30 sets control gain GAIN to G2 which is larger than the gain which is set in S314. In this case, at least one of proportion gain KP and integration gain KI is changed.

In S320 to S331, ECU 30 determines which of the arms is to undergo the single-arm drive control, based on reactor current command value ILREF. Then, ECU 30 uses control gain GAIN which is set in S313 or S314 to calculate duty cycle DUTY in S340 and generate and output control command PWC to converter 12 in S350.

In this way, the single-arm drive control is performed so that control gain GAIN used by current control calculation unit 222 is set to a large value when reactor current command value ILREF is in such a range where a change of duty cycle DUTY is large. Thus, control can be performed in accordance with a change of duty cycle DUTY, and therefore, when reactor current IL changes through zero, a variation of system voltage VM can be suppressed.

Figure 30:
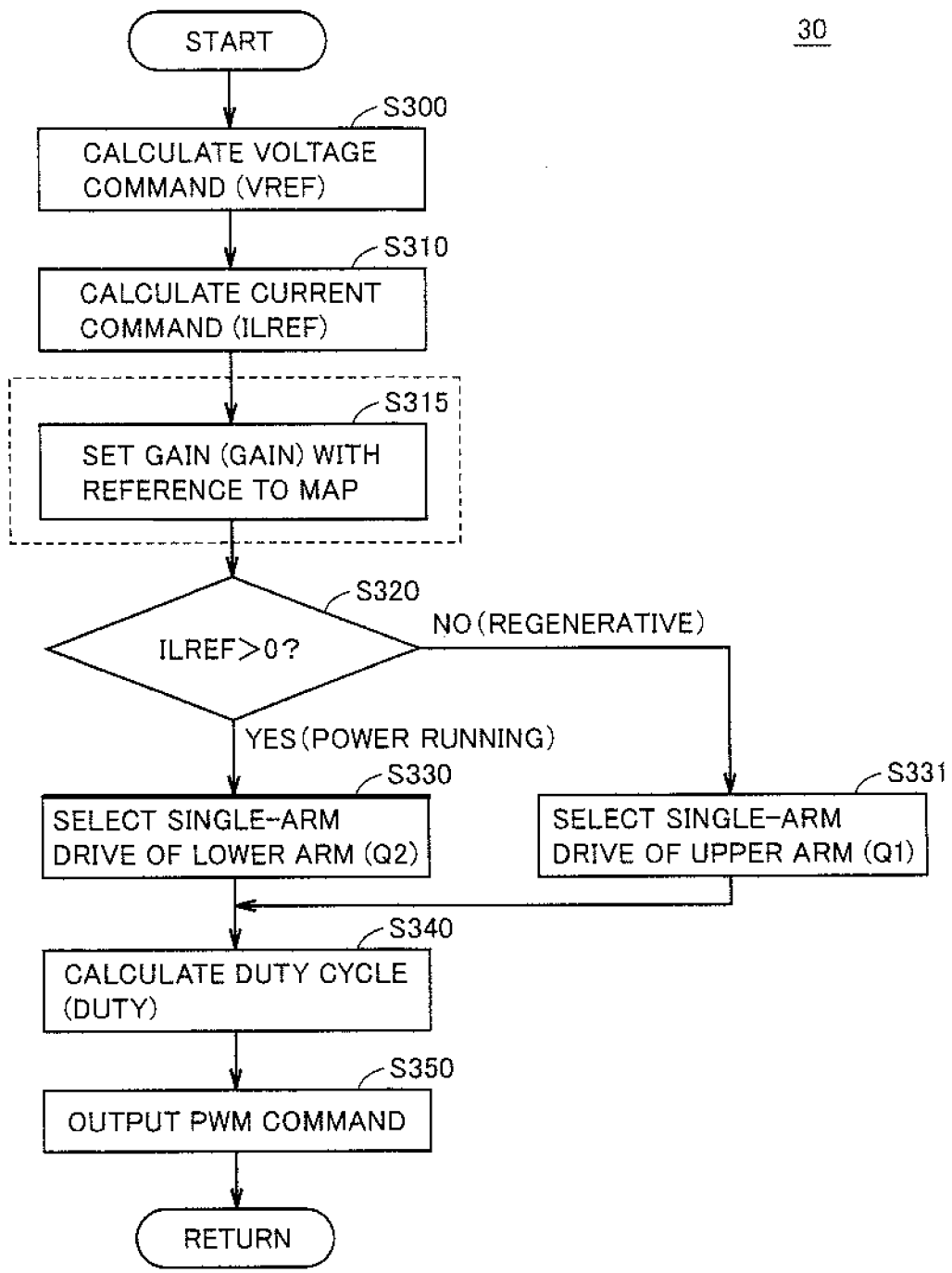
FIG. 30 is a flowchart in the case where a control gain GAIN is set based on a map which is set in advance, as a method of setting control gain GAIN.

FIG. 30 is a flowchart illustrating a process in which control gain GAIN is set by means of a preset map, as one method of setting control gain GAIN. FIG. 30 differs from FIG. 29 in that step S315 is added to replace steps S311A, S312A, S313, and S314 in FIG. 29. The description of the steps common to FIG. 30 and FIG. 29 will not be repeated.

Referring to FIG. 30, ECU 30 calculates reactor current command value ILREF in S310 and proceeds to S315. In S315, ECU 30 refers to a preset map as shown in FIG. 31 to set proportion gain KP and integration gain KI in accordance with reactor current command value ILREF.

Then, ECU 30 uses control gain GAIN which is set in S315 to perform the process after S320 in a similar manner to the first embodiment.

Figure 31:
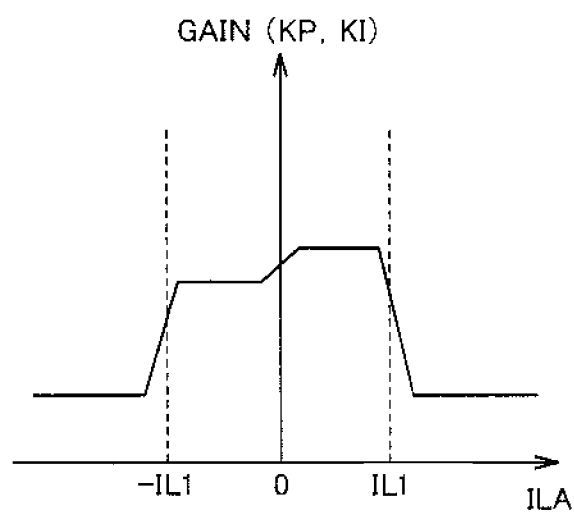
FIG. 31 is a diagram showing an example of the map based on which control gain GAIN is set in the second embodiment.

In the map used at this time, by setting the control gain to a large value for the range where the variation of duty cycle DUTY is large as shown in FIG. 31, control following the variation of duty cycle DUTY can be achieved as the same as in FIG. 29. Therefore, a variation of system voltage VM when reactor current IL changes through zero can be suppressed.

To the second embodiment as well, the modification of the first embodiment may be applied.

Third Embodiment

Regarding the single-arm drive control in the first embodiment and the second embodiment, in the region (State B in FIG. 2) where the load current is particularly small, the ON time of switching elements Q1, Q2 is relatively shorter than that of the dual-arm drive control. Therefore, the ON time of switching elements Q1, Q2 can be increased to the same extent as the dual-arm drive control for example, and accordingly the number of times switching elements Q1, Q2 are driven (the number of times switching is done) can be reduced. In this way, the number of times switching elements Q1, Q2 are driven can be reduced to thereby reduce the switching loss. A further improvement in efficiency can thus be expected.

Thus, in connection with the third embodiment, a description will be given of the single-arm drive control which further includes intermittent drive control under which switching elements Q1, Q2 are intermittently driven for the region where the load current is small.

Figure 32:
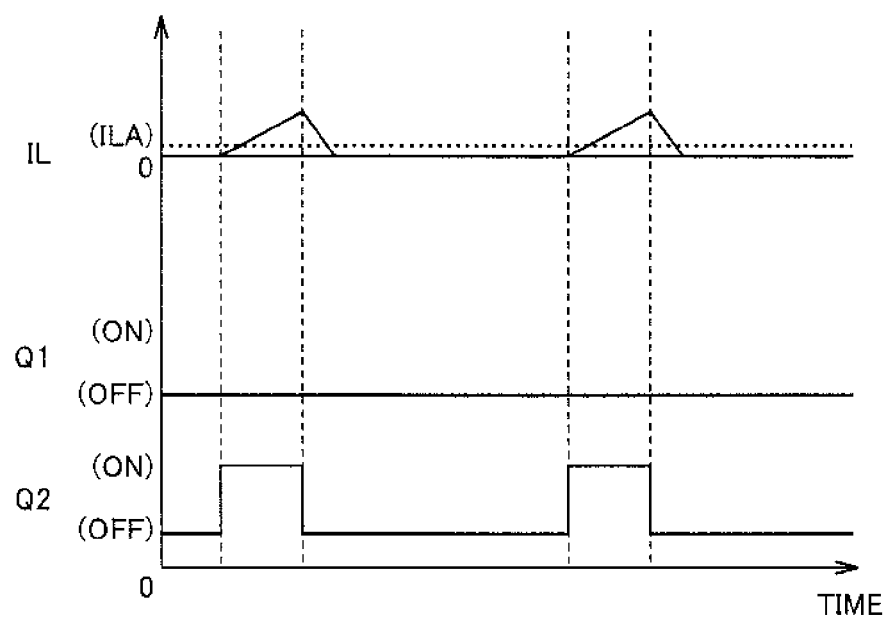
FIG. 32 is a time chart for illustrating changes with time of reactor current IL and switching elements Q1, Q2 in the case of State B1 in a third embodiment.
Figure 33:
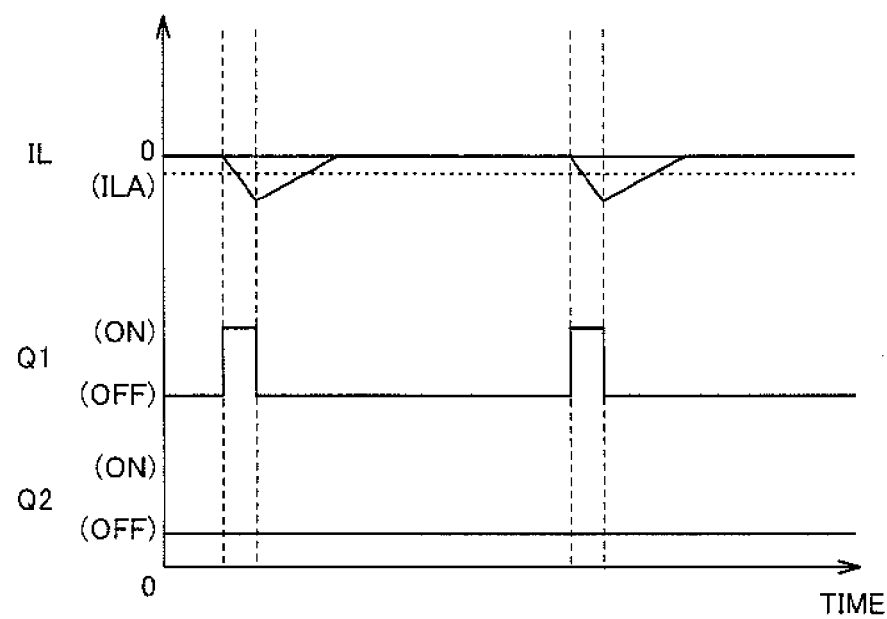
FIG. 33 is a time chart for illustrating changes with time of reactor current IL and switching elements Q1, Q2 in the case of State B2 in the third embodiment.

FIGS. 32 and 33 are time charts in the third embodiment for illustrating changes with time of reactor current IL and switching elements Q1, Q2 in State B (State B1, State B2) of FIG. 2 where the load current is small. FIGS. 32 and 33 correspond to FIGS. 11 and 12 described above in connection with the first embodiment.

First, the power running operation will be described. Referring to FIGS. 11 and 32, FIG. 11 illustrates that the single-arm drive control is performed so that the current in the negative direction of reactor current IL does not flow, and accordingly the drive time (duty cycle) of switching element Q2 is shorter than that of the dual-arm drive control, as described above in connection with the first embodiment.

In the third embodiment, as illustrated in FIG. 32, the drive time of switching element Q2 is set longer than that in FIG. 11. The ON time is set for example to the time substantially equal to that of the dual-arm drive control. Accordingly, the time for which switching element Q2 is powered per switching is identical to that of the dual-arm drive control, and therefore, the load of switching element Q2 per switching can be prevented from increasing.

Here, the drive time of switching element Q2 is increased and accordingly reactor current IL is larger than that in FIG. 11. Therefore, if switching element Q2 is driven for the same period as that in FIG. 11, reactor average current ILA will be larger than reactor current command value ILREF.

Then, the timing at which switching element Q2 is turned on next time is delayed, so that the average value, along the time axis, of reactor current IL which flows for the increased ON time of switching element Q2 (namely reactor average current ILA) is equal to reactor current command value ILREF. In this way, the number of times switching element Q2 is driven per unit time can be reduced, and therefore, a switching loss which is generated when switching element Q2 is driven can be reduced.

As to the increase of the drive time of switching element Q2, the drive time can be made longer than that of the dual-arm drive control as long as the rated current of switching element Q2 has an allowance. In this case, while the load of switching element Q2 per switching increases, the number of times switching element Q2 is driven decreases, and therefore, the total load of switching element Q2 may not increase. Therefore, in consideration of the rated current and the total load of switching element Q2, the time for which switching element Q2 is driven is set.

The regenerative operation in FIG. 33 is similar to that in FIG. 32 except that the direction of reactor current IL and the switching element to be driven are different, and the detailed description thereof will not be repeated.

Figure 34:
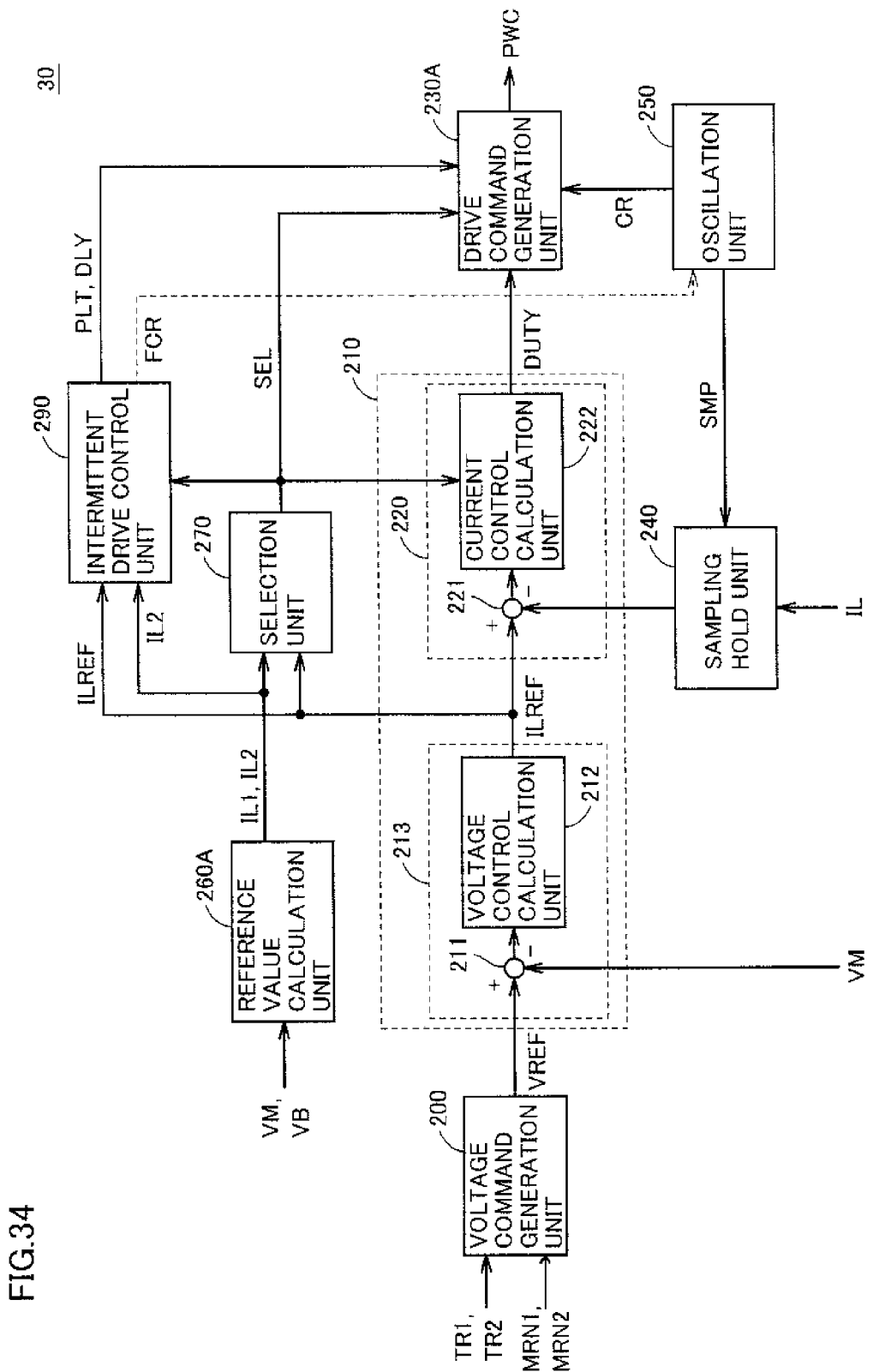
FIG. 34 is a functional block diagram for illustrating single-arm drive control executed by the ECU in the third embodiment.

FIG. 34 is a functional block diagram for illustrating the single-arm drive control executed by ECU 30 in the third embodiment. FIG. 34 differs from the functional block diagram of the first embodiment shown in FIG. 16 in that reference value calculation unit 260 and drive command generation unit 230 in FIG. 16 are replaced respectively with a reference value calculation unit 260A and a drive command generation unit 230A, and an intermittent drive control unit 290 is added. The description of the functional blocks common to FIGS. 34 and 16 will not be repeated.

Referring to FIG. 34, reference value calculation unit 260A calculates above-described current reference value IL1, and further sets a current reference value IL2 (IL2<IL1) which is used for determining whether to perform intermittent drive. Then, reference value calculation unit 260A outputs this current reference value IL2 to intermittent drive control unit 290.

Intermittent drive control unit 290 receives reactor current command value ILREF from voltage control calculation unit 212, receives selection flag SEL from selection unit 270, and receives current reference value IL2 from reference value calculation unit 260A.

Intermittent drive control unit 290 determines which of the upper arm (switching element Q1) and the lower arm (switching element Q2) is selected to be applied to the single-arm drive control based on selection flag SEL. Intermittent drive control unit 290 also compares reactor current command value ILREF and current reference value IL2 with each other and, when reactor current command value ILREF falls in the range of ±IL2 (−IL2<ILREF<IL2), determines that the intermittent drive control is to be performed.

In the case where intermittent drive control unit 290 determines that the intermittent drive control is to be performed, it sets drive time PLT per switching of switching elements Q1, Q2 and outputs the set time to drive command generation unit 230. Further, intermittent drive control unit 290 uses the current supplied in drive time PLT and sets drive interval DLY (waiting time) of switching elements Q1, Q2 so that the average value of the current along the time axis (reactor average current ILA) satisfies reactor current command value ILREF, and outputs the drive interval to drive command generation unit 230A.

Drive command generation unit 230A generates control signal PWC and outputs it to converter 12, based on drive time PLT and drive interval DLY that are input from intermittent drive control unit 290.

Figure 35:
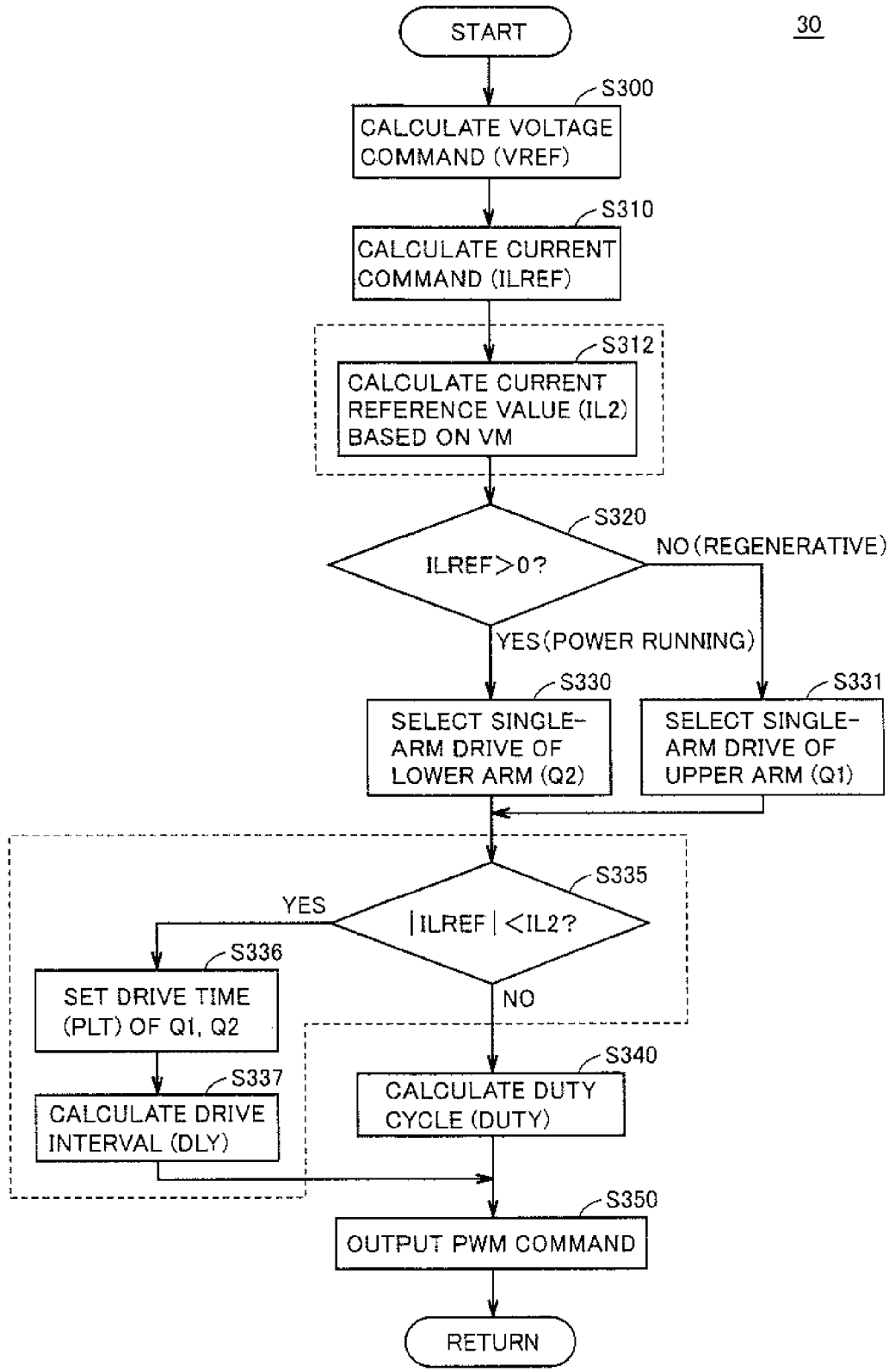
FIG. 35 is a flowchart for illustrating details of a single-arm drive control process executed by the ECU in the third embodiment.

FIG. 35 is a flowchart for illustrating details of the single-arm drive control process executed by ECU 30 in the third embodiment. FIG. 35 differs from the flowchart shown in FIG. 17 of the first embodiment in that steps S312, S335, S336, and S337 are added. The description of the steps common to FIG. 35 and FIG. 17 will not be repeated.

Referring to FIGS. 34 and 35, ECU 30 calculates reactor current command value ILREF in S310, and then calculates current reference value IL2 based on system voltage VM in S312. Current reference value IL2 may be calculated for example in a similar manner to that for current reference value IL1 in the first embodiment.

Subsequently, ECU 30 in S320 to S331 selects an arm for which the single-arm drive control is to be performed, based on reactor current command value ILREF. Then, ECU 30 in S335 determines whether reactor current command value ILREF is in the range of ±IL2 (−IL2<ILREF<IL2) or not, namely whether to perform the intermittent drive control or not.

In the case where reactor current command value ILREF is in the range of ±IL2 (−IL2<ILREF<IL2) (YES in S335), the process proceeds to S336, and drive time PLT per switching of switching elements Q1, Q2 is set.

Next, ECU 30 in S337 calculates drive interval DLY of switching elements Q1, Q2 so that the average value of the current along the time axis satisfies reactor current command value ILREF.

Then, based on drive time PLT and drive interval DLY, ECU 30 in S350 generates and outputs control command PWC for converter 12.

In contrast, in the case where reactor current command value ILREF is not in the range of ±IL2 (−IL2<ILREF<IL2) (NO in S335), the intermittent drive control is not performed. The process then proceeds to S340 in which current control calculation unit 222 calculates duty cycle DUTY of switching elements Q1, Q2. Then, ECU 30 in S350 generates and outputs control command PWC for converter 12, based on a comparison between duty cycle DUTY and carrier wave CR from oscillation unit 250.

The control that follows the above-described process can be carried out to reduce a conduction loss of reactor L1 due to the ripple current, by means of the single-arm drive control for the region where the load power is small, and further reduce the number of times switching elements Q1, Q2 is driven per unit time, by means of the intermittent drive control, and accordingly, the switching loss can be reduced. The efficiency of converter 12 can thus be improved.

The intermittent drive control may also be carried out in the manner other than the above-described manner of setting drive time PLT and drive interval DLY of switching elements Q1, Q2, such as the manner in which carrier frequency FC of carrier wave CR is reduced by oscillation unit 250 to reduce the number of times switching elements Q1, Q2 are driven per unit time.

In this case, intermittent drive control unit 290 in FIG. 34 determines, based on selection flag SEL, reactor current command value ILREF, and current reference value IL2, that the intermittent drive control is to be performed, and then outputs carrier frequency change command FCR to oscillation unit 250 for changing carrier frequency FC (the broken-line arrow in FIG. 34). Here, as to carrier frequency change command FCR, a fixed frequency that is set in advance may be used, or the frequency may be varied with reference to a map or the like.

Then, oscillation unit 250 outputs carrier wave CR in accordance with carrier frequency change command FCR to drive command generation unit 230. Drive command generation unit 230 generates and outputs control command PWC for converter 12, based on duty cycle DUTY from current control calculation unit 222 and carrier wave CR from oscillation unit 250.

Figure 36:
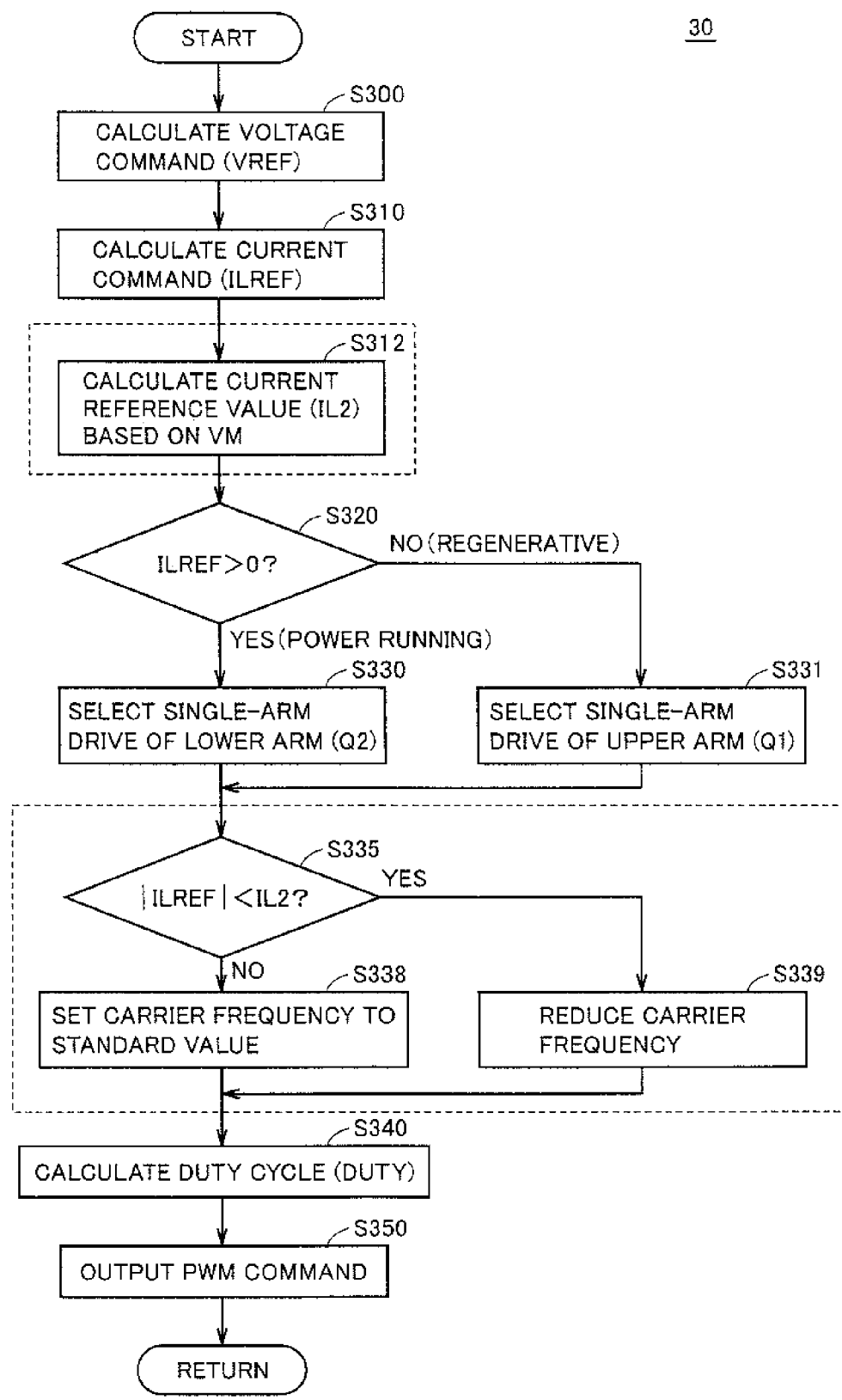
FIG. 36 is a flowchart for illustrating details of a single-arm drive control process executed by the ECU in the case of intermittent drive control under which a carrier frequency FC is changed.

FIG. 36 is a flowchart for illustrating details of the single-arm drive control process executed by ECU 30 in the case of the intermittent drive control under which carrier frequency FC is changed. FIG. 36 differs from the flowchart shown in FIG. 35 in that S338 and S339 are added instead of S336 and S337. The description of the steps common to FIG. 36 and FIGS. 17 and 35 will not be repeated.

Referring to FIGS. 34 and 36, when ECU 30 determines that the intermittent drive control is to be performed (YES in S335), ECU 30 proceeds to S339 in which the setting of carrier frequency FC is changed so that it is reduced. Then ECU 30 in S340 calculates duty cycle DUTY of switching elements Q1, Q2 and ECU 30 in S350 generates and outputs control command PWC for converter 12, based on carrier wave CR of carrier frequency FC which is changed in S339 and duty cycle DUTY.

In contrast, when ECU 30 determines that the intermittent drive control is not to be performed (NO in S335), ECU 30 proceeds to S338 to set carrier frequency FC to a standard value, calculates duty cycle DUTY of switching elements Q1, Q2 (S340), and generates and outputs control command PWC for converter 12 (S350).

The control performed following the above-described process can reduce the number of times switching elements Q1, Q2 are driven per unit time for the region where the load power is small under the single-arm drive control, and can accordingly improve the efficiency of converter 12.

To the third embodiment as well, the modification of the first embodiment and the second embodiment may be applied.

Fourth Embodiment

In connection with the first to third embodiments, the description has been given of the way to determine whether to perform the single-arm drive control or not based on reactor current command value ILREF.

The single-arm drive control, however, requires instantaneous change of the switching element to be driven, particularly in the case where the power running state is switched to the regenerative state or the regenerative state is switched to the power running state. Therefore, when the load power sharply changes in such a case where vehicle 100 suddenly accelerates or suddenly decelerates, the switching time of the switching element may be delayed due to the restriction on the control period or the minimum time required for driving the switching element, resulting in a large variation of system voltage VM. In such a case, it is necessary to strengthen protection so that switching elements Q1 to Q8 of converter 12 and inverter 14 may not be damaged by overvoltage.

In view of the above, in connection with a fourth embodiment, a description will be given of the way to determine whether the single-arm drive control can be performed or not based on a variation of the load and, when an abrupt load variation occurs, to stop the single-arm drive control for the sake of device protection.

Figure 37:
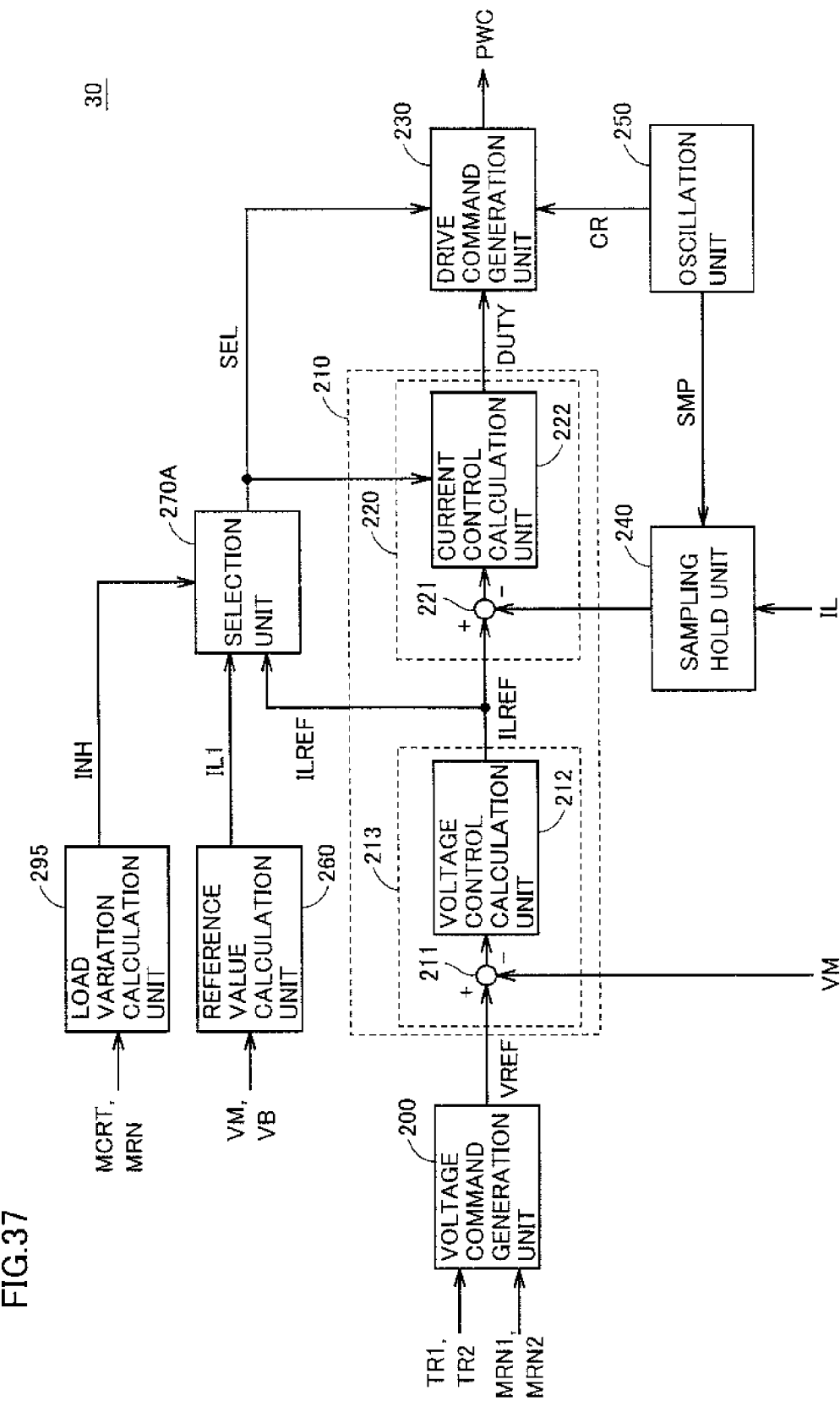
FIG. 37 is a functional block diagram for illustrating single-arm drive control executed by the ECU in a fourth embodiment.

FIG. 37 is a functional block diagram for illustrating the single-arm drive control executed by ECU 30 in the fourth embodiment. FIG. 37 differs from the functional block diagram in the first embodiment shown in FIG. 16 in that a selection unit 270A replaces selection unit 270, and a load variation calculation unit 295 is added. The description of the functional blocks common to FIG. 37 and FIG. 16 will not be repeated.

Referring to FIGS. 1 and 37, load variation calculation unit 295 receives from current sensors 24, 25 motor currents MCRT1, MCRT2 of motor generators MG1, MG2, and rotational speeds MRN1, MRN2 of motor generators MG1, MG2. Based on motor currents MCRT1, MCRT2 or rotational speeds MRN1, MRN2, load variation calculation unit 295 calculates a load variation LD. As load variation LD, a variation per unit time of motor currents MCRT1, MCRT2, or a variation per unit time of rotational speeds MRN1, MRN2 for example may be used.

When calculated load variation LD is larger than a preset reference value, load variation calculation unit 295 outputs a single-arm drive control inhibition flag INH to selection unit 270A.

Selection unit 270A receives single-arm drive control inhibition flag INH from load variation calculation unit 295. When the single-arm drive control is inhibited by single-arm drive control inhibition flag INH, selection unit 270A sets selection flag SEL so that converter 12 is driven by the dual-arm drive control regardless of reactor current command value ILREF.

Figure 38:
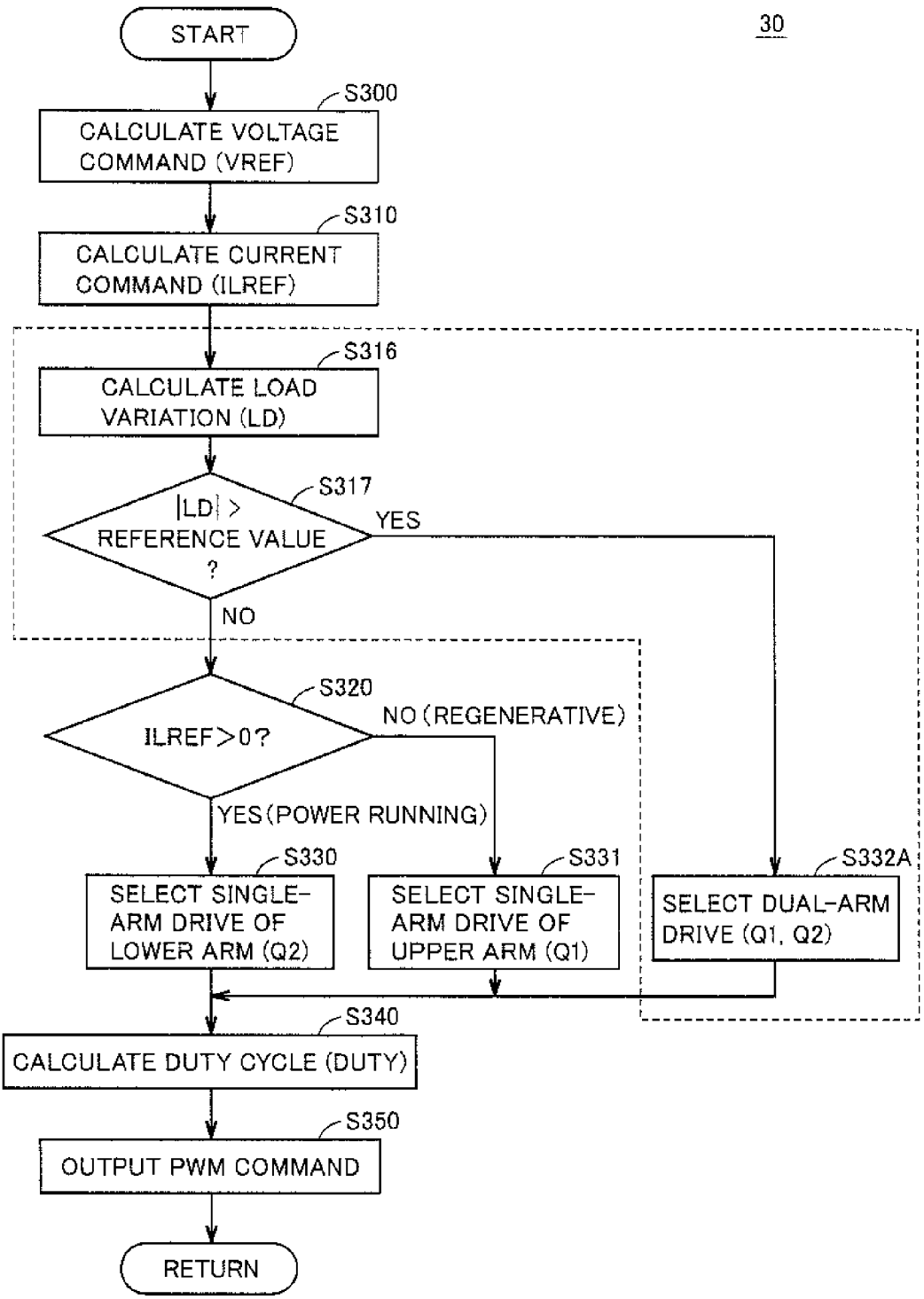
FIG. 38 is a flowchart for illustrating details of a single-arm drive control process executed by the ECU in the fourth embodiment.

FIG. 38 is a flowchart for illustrating details of the single-arm drive control process executed by ECU 30. FIG. 38 differs from the flowchart shown in FIG. 17 of the first embodiment in that steps S316, S317, and S332A are added. The description of the steps common to FIG. 38 and FIG. 17 will not be repeated.

Referring to FIGS. 37 and 38, ECU 30 in S310 causes voltage control calculation unit 212 to calculate reactor current command value ILREF, and then proceeds to S316 in which load variation LD is calculated based on motor current MCRT and/or motor rotational speed MRN.

Next, ECU 30 determines in S317 whether load variation LD is larger than a predetermined reference value LIM or not, namely whether an abrupt load variation occurs or not. The load variation here may be an increase or a decrease, and therefore, the absolute value of load variation LD and reference value LIM are compared with each other in S317.

When load variation LD is larger than predetermined reference value LIM, namely it is determined that an abrupt load variation occurs (YES in S317), ECU 30 proceeds to S322A to select the dual-arm drive control. ECU 30 then calculates the duty cycle of switching elements Q1, Q2 (S340), and generates and outputs control command PWC to converter 12 (S350).

In contrast, when load variation LD is equal to or smaller than predetermined reference value LIM (NO in S317), no abrupt load variation occurs, and accordingly the process is executed from S320 and the single-arm drive control is performed similarly to the first embodiment.

The control following the above-described process can inhibit the single-arm drive control, in the case where an abrupt load variation occurs. Accordingly, switching elements Q1 to Q8 can be prevented from being damaged by the variation of system voltage VM due to an abrupt load variation.

Converter 12 in the present embodiments is an example of "voltage converter" of the present invention. Further, the single-arm drive control and the dual-arm drive control in the present embodiments are examples of "first mode" and "second mode" respectively of the present invention.

It should be construed that embodiments disclosed herein are by way of illustration in all respects, not by way of limitation. It is intended that the scope of the present invention is defined by claims, not by the above description of the embodiments, and encompasses all modifications and variations equivalent in meaning and scope to the claims.

REFERENCE SIGNS LIST 10, 13 voltage sensor; 11, 18, 24, 25 current sensor; 12 converter; 14, 22, 23 inverter; 15 U phase upper-lower arm; 16 V phase upper-lower arm; 17 W phase upper-lower arm; 20 DC voltage generation unit; 26, 27 rotational angle sensor; 28 power storage device; 30 ECU; 40 engine; 41 power split device; 42 drive wheel; 45 load device; 100 vehicle; 200 voltage command generation unit; 210 voltage control unit; 211 subtraction unit; 212 voltage control calculation unit; 213 current command generation unit; 220 current control unit; 221 subtraction unit; 222 current control calculation unit; 223 proportion control unit; 224 integration control unit; 225 integrator; 226 addition unit; 230, 230A drive command generation unit; 240 sampling hold unit; 250 oscillation unit; 260, 260A reference value calculation unit; 270, 270A selection unit; 280 gain calculation unit; 290 intermittent drive control unit; 295 load variation calculation unit; C1, C2 smoothing capacitor; D1-D8 diode; L1 reactor; MG1, MG2 motor generator; NL ground line; PL1, PL2 electric power line; Q1-Q8 switching element; SR1, SR2 system relay

The invention claimed is:

1. A control device for a voltage converter capable of a voltage conversion between a power storage device and a load device, said voltage converter comprising:
a first switching element and a second switching element connected in series between an electric power line for said load device and a ground line;
a first rectifying element and a second rectifying element connected in parallel with said first switching element and said second switching element respectively, with a forward direction being defined as a direction from said ground line toward said electric power line; and
a reactor provided on a path connecting a connection node of said first switching element and said second switching element, and a positive terminal of said power storage device, and said control device comprising:
a current command calculation unit configured to calculate a current command value of a current flowing through said reactor by performing feedback control of a voltage between said electric power line and said ground line;
a selection unit configured to select one of said first switching element and said second switching element in accordance with said current command value; and a drive command generation unit configured to generate a drive command for the switching element selected by said selection unit; wherein said selection unit selects said second switching element when said current command value represents a direction from said power storage device toward said load device, and selects said first switching element when said current command value represents a direction from said load device toward said power storage device.

2. The control device for a voltage converter according to claim 1, wherein said voltage converter has a first mode and a second mode as operation modes, in said first mode, a voltage conversion is performed by driving the switching element selected by said selection unit, in said second mode, a voltage conversion is performed by driving both said first switching element and said second switching element, said voltage converter further comprises a voltage detector for detecting a voltage between said electric power line and said ground line, said control device further comprises a reference value calculation unit configured to calculate a current range in which said first mode is executed, based on the voltage detected by said voltage detector, and said selection unit causes said first mode to be executed when said current command value falls in said current range, and causes said second mode to be executed when said current command value falls out of said current range.

3. The control device for a voltage converter according to claim 2, wherein said voltage converter further comprises a current detector configured to detect a reactor current flowing through said reactor, said control device further comprises:
 a current control unit configured to perform feedback control based on a comparison between said current command value and said reactor current; and
 a gain calculation unit configured to be capable of making a feedback gain variable of said current control unit in accordance with said current command value, and when said first mode is executed, said gain calculation unit makes said feedback gain larger relative to when said second mode is executed.

4. The control device for a voltage converter according to claim 2, wherein said control device further comprises an intermittent drive control unit configured to reduce a drive number representing the number of times said first switching element and said second switching element are driven per unit time, in accordance with said current command value, when said first mode is executed.

5. The control device for a voltage converter according to claim 4, wherein when said first mode is executed, said intermittent drive control unit sets an ON period of said first switching element and said second switching element longer relative to when said drive number is not reduced, and sets said drive number per unit time so that an average value of said reactor current along a time axis is equal to said current command value.

6. The control device for a voltage converter according to claim 4, wherein when said first mode is executed, said intermittent drive control unit performs control so that a carrier frequency for controlling switching of said first switching element and said second switching element is reduced.

7. The control device for a voltage converter according to claim 2, wherein said control device further comprises a load calculation unit configured to detect a load variation of said load device, and when said load variation falls out of a reference range, said selection unit causes said second mode to be executed regardless of said current command value.

8. A vehicle comprising:

a power storage device;

a rotating electric machine for generating a drive force to propel said vehicle;

an inverter for driving said rotating electric machine;

a voltage converter configured to be capable of a voltage conversion between said power storage device and said inverter; and a control device for controlling said voltage converter, said voltage converter comprising:
 a first switching element and a second switching element connected in series between an electric power line for said inverter and a ground line;
 a first rectifying element and a second rectifying element connected in parallel with said first switching element and said second switching element, respectively, with a forward direction being defined as a direction from said ground line toward said electric power line; and
 a reactor provided on a path connecting a connection node of said first switching element and said second switching element and a positive terminal of said power storage device, and said control device comprising:
 a current command calculation unit configured to calculate a current command value of a current flowing through said reactor by performing feedback control of a voltage between said electric power line and said ground line;
 a selection unit configured to select one of said first switching element and said second switching element in accordance with said current command value; and
 a drive command generation unit configured to generate a drive command for the switching element selected by said selection unit; wherein said selection unit selects said second switching element when said current command value represents a direction from said power storage device toward said inverter, and selects said first switching element when said current command value represents a direction from said inverter toward said power storage device.

9. The vehicle according to claim 8, wherein said voltage converter has a first mode and a second mode as operation modes, in said first mode, a voltage conversion is performed by driving the switching element selected by said selection unit, in said second mode, a voltage conversion is performed by driving both said first switching element and said second switching element, said voltage converter further comprises a voltage detector for detecting a voltage between said electric power line and said ground line, said control device further comprises a reference value calculation unit configured to calculate a current range in which said first mode is executed, based on the voltage detected by said voltage detector, and said selection unit causes said first mode to be executed when said current command value falls in said current range, and causes said second mode to be executed when said current command value falls out of said current range.

10. The vehicle according to claim 9, wherein said voltage converter further comprises a current detector configured to detect a reactor current flowing through said reactor, said control device further comprises:
- a current control unit configured to perform feedback control based on a comparison between said current command value and said reactor current; and
- a gain calculation unit configured to be capable of making a feedback gain variable of said current control unit in accordance with said current command value, and when said first mode is executed, said gain calculation unit makes said feedback gain larger relative to when said second mode is executed.

11. The vehicle according to claim 9, wherein said control device further comprises an intermittent drive control unit configured to reduce a drive number representing the number of times said first switching element and said second switching element are driven per unit time, in accordance with said current command value, when said first mode is executed.

12. The vehicle according to claim 9, wherein said control device further comprises a load calculation unit configured to detect a load variation of said inverter, and when said load variation falls out of a reference range, said selection unit causes said second mode to be executed regardless of said current command value.

13. A control method for a voltage converter capable of a voltage conversion between a power storage device and a load device, said voltage converter comprising:
- a first switching element and a second switching element connected in series between an electric power line for said load device and a ground line;
- a first rectifying element and a second rectifying element connected in parallel with said first switching element and said second switching element, respectively, with a forward direction being defined as a direction from said ground line toward said electric power line; and
- a reactor provided on a path connecting a connection node of said first switching element and said second switching element and a positive terminal of said power storage device, and said control method comprising the steps of:

calculating a current command value of a current flowing through said reactor by performing feedback control of a voltage between said electric power line and said ground line;

selecting one of said first switching element and said second switching element in accordance with said current command value; and generating a drive command for the switching element selected by said selecting step;

wherein said second switching element is selected when said current command value represents a direction from said power storage device toward said load device, and said first switching element is selected when said current command value represents a direction from said load device toward said power storage device.

\* \* \* \* \*